United States Patent
Terada et al.

(10) Patent No.: US 9,749,647 B2
(45) Date of Patent: *Aug. 29, 2017

(54) IMAGE CODING METHOD, IMAGE DECODING METHOD, IMAGE CODING APPARATUS, IMAGE DECODING APPARATUS, AND IMAGE CODING AND DECODING APPARATUS

(71) Applicant: Panasonic Intellectual Property Corporation of America, Torrance, CA (US)

(72) Inventors: Kengo Terada, Osaka (JP); Youji Shibahara, Tokyo (JP); Kyoko Tanikawa, Osaka (JP); Hisao Sasai, Osaka (JP); Toshiyasu Sugio, Osaka (JP); Toru Matsunobu, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/042,410

(22) Filed: Feb. 12, 2016

(65) Prior Publication Data
US 2016/0165240 A1     Jun. 9, 2016

Related U.S. Application Data

(63) Continuation of application No. 14/609,811, filed on Jan. 30, 2015, now Pat. No. 9,326,005, which is a
(Continued)

(51) Int. Cl.
*G06K 9/36*     (2006.01)
*H04N 19/186*   (2014.01)
(Continued)

(52) U.S. Cl.
CPC .......... *H04N 19/186* (2014.11); *G06T 9/007* (2013.01); *H04N 19/119* (2014.11);
(Continued)

(58) Field of Classification Search
None
See application file for complete search history.

(56) References Cited

U.S. PATENT DOCUMENTS 5,057,911 A    10/1991   Stec et al.
8,165,214 B2   4/2012    Iliev
(Continued)

OTHER PUBLICATIONS

ISO/IEC 14496-10 (MPEG-4 Part 10: Advanced Video Coding), Oct. 1, 2004.
(Continued)

*Primary Examiner* — Andrae S Allison
(74) *Attorney, Agent, or Firm* — Wenderoth, Lind & Ponack, L.L.P.

(57) ABSTRACT

An image coding method in which a chroma component and a luma component of an input image including one or more transform blocks are transformed to code the input image. The luma component has the same size as the current transform block. The chroma component is smaller than the current transform block. In the method, when the current transform block has a first minimum size, the chroma component is transformed on a basis of a block resulting from binding a plurality of the chroma blocks to has the same size as the luma block, and when the current transform block has a size other than the first minimum size, a CBF flag indicating whether or not coefficients of the chroma component include a non-zero coefficient is not coded.

1 Claim, 39 Drawing Sheets

Related U.S. Application Data continuation of application No. 14/018,657, filed on Sep. 5, 2013, now Pat. No. 9,031,334.

(60) Provisional application No. 61/698,765, filed on Sep. 10, 2012.

(51) Int. Cl.

| | | |
|---|---|---|
| *G06T 9/00* | (2006.01) | |
| *H04N 19/176* | (2014.01) | |
| *H04N 19/70* | (2014.01) | |
| *H04N 19/119* | (2014.01) | |
| *H04N 19/122* | (2014.01) | |
| *H04N 19/61* | (2014.01) | |
| *H04N 19/96* | (2014.01) | |
| *H04N 19/136* | (2014.01) | |
| *H04N 19/157* | (2014.01) | |
| *H04N 19/137* | (2014.01) | |
| *H04N 19/60* | (2014.01) | |

(52) U.S. Cl.
CPC ......... *H04N 19/122* (2014.11); *H04N 19/136* (2014.11); *H04N 19/137* (2014.11); *H04N 19/157* (2014.11); *H04N 19/176* (2014.11); *H04N 19/60* (2014.11); *H04N 19/61* (2014.11); *H04N 19/70* (2014.11); *H04N 19/96* (2014.11)

(56) References Cited

U.S. PATENT DOCUMENTS

| | | | |
|---|---|---|---|
| 8,270,472 B2 | 9/2012 | Lai et al. | |
| 8,275,042 B2 | 9/2012 | Ma et al. | |
| 8,275,045 B2 | 9/2012 | Ye et al. | |
| 8,860,785 B2 | 10/2014 | Ji et al. | |
| 2004/0233993 A1 | 11/2004 | Johansen | |
| 2011/0243225 A1* | 10/2011 | Min | H04N 19/44 |
| | | | 375/240.12 |
| 2012/0230421 A1 | 9/2012 | Chen et al. | |
| 2013/0034154 A1* | 2/2013 | Song | H04N 19/176 |
| | | | 375/240.03 |
| 2013/0107970 A1* | 5/2013 | Wang | H04N 19/176 |
| | | | 375/240.18 |
| 2013/0128971 A1 | 5/2013 | Guo et al. | |
| 2013/0128985 A1* | 5/2013 | He | H04N 19/176 |
| | | | 375/240.18 |
| 2013/0188698 A1 | 7/2013 | Chien et al. | |
| 2013/0230103 A1 | 9/2013 | Lim | |
| 2013/0251026 A1 | 9/2013 | Guo | |
| 2013/0258052 A1 | 10/2013 | Li et al. | |
| 2013/0287104 A1* | 10/2013 | Jeong | H04N 19/00569 |
| | | | 375/240.12 |
| 2014/0161189 A1 | 6/2014 | Zhang | |
| 2014/0254677 A1 | 9/2014 | Oh | |
| 2014/0292834 A1* | 10/2014 | Ando | G09G 3/20 |
| | | | 345/690 |
| 2014/0314142 A1 | 10/2014 | Oh | |
| 2014/0355669 A1 | 12/2014 | Chien | |
| 2015/0092862 A1* | 4/2015 | Yu | H04N 19/503 |
| | | | 375/240.18 |

OTHER PUBLICATIONS

Benjamin Bross et al., "High efficiency video coding (HEVC) text specification draft 8", Joint Collaborative Team on Video Coding (JCT-VC) of ITU-T SG16 WP3 and ISO/IEC JTC1/SC29/WG11, JCTVC-J1003_d7, Ver. 8, 10th Meeting: Stockholm, SE, Jul. 11-20, 2012.

International Search Report issued Dec. 3, 2013 in corresponding International Application No. PCT/JP2013/005051.

Benjamin Bross et al., "High efficiency video coding (HEVC) text specification draft 7", Joint Collaborative Team on Video Coding (JCT-VC) of ITU-T SG16 WP3 and ISO/IEC JTC1/SC29/WG11 9th Meeting: Geneva, CH, Apr. 27, 2012-May 7, 2012, [JCTVC-I1003_d9], 7.3.8, 7.3.9.

Tim Hellman et al., "Changing Luma/Chroma Coefficient Interleaving from CU to TU level", Joint Collaborative Team on Video Coding (JCT-VC) of ITU-T SG16 WP3 and ISO/IEC JTC1/SC29/WG11 7th Meeting: Geneva, CH, Nov. 21-30, 2011, [JCTV-G112].

Liwei Guo et al., "Unified CBFU and CBFV Coding in RQT", Joint Collaborative Team on Video Coding (JCT-VC) of ITU-T SG16 WP3 and ISO/IEC JTC1/SC29/WG11 9th Meeting: Geneva, Apr. 27, 2012-May 7, 2012, [JCTVC-I03321].

Marge et al., "Video Compression Using Nested Quadtree Structures, Leaf Merging, and Improved Techniques for Motion Representation and Entropy Coding", IEEE Transactions on Circuits and Systems for Video Technology, vol. 20, No. 12, Dec. 2010.

\* cited by examiner

FIG. 26

Video stream (PID=0x1011, Primary video)

Audio stream (PID=0x1100)

Audio stream (PID=0x1101)

Presentation graphics stream (PID=0x1200)

Presentation graphics stream (PID=0x1201)

Interactive graphics stream (PID=0x1400)

Video stream (PID=0x1B00, Secondary video)

Video stream (PID=0x1B01, Secondary video)

FIG. 29
Stream of TS packets
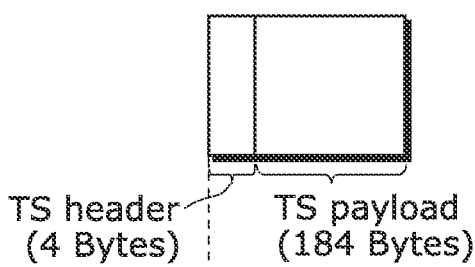
Stream of source packets
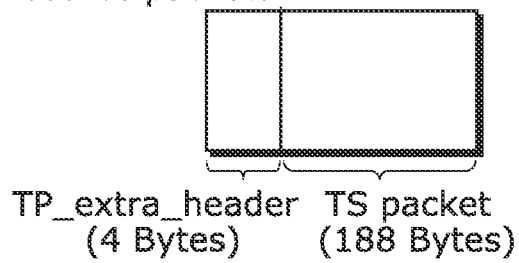
Multiplexed data
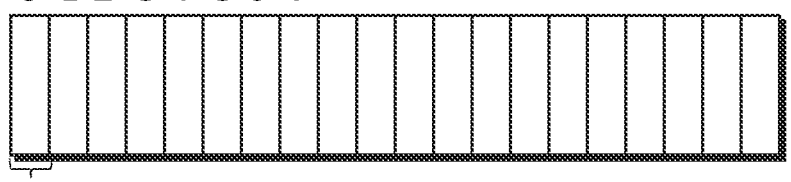

FIG. 37

| Corresponding standard | Driving frequency |
|---|---|
| MPEG-4 AVC | 500 MHz |
| MPEG-2 | 350 MHz |
| ⋮ | ⋮ |

IMAGE CODING METHOD, IMAGE DECODING METHOD, IMAGE CODING APPARATUS, IMAGE DECODING APPARATUS, AND IMAGE CODING AND DECODING APPARATUS

CROSS REFERENCE TO RELATED APPLICATIONS

This is a continuation of application Ser. No. 14/609,811, filed Jan. 30, 2015, which is a continuation of application Ser. No. 14/018,657, filed Sep. 5, 2013, now U.S. Pat. No. 9,031,334, which claims the benefit of U.S. Provisional Patent Application No. 61/698,765, filed Sep. 10, 2012. The entire disclosures of the above-identified applications, including the specifications, drawings and claims are incorporated herein by reference in their entirety.

FIELD

The present disclosure relates to an image coding method for image coding or an image decoding method for image decoding.

BACKGROUND

A technique relating to an image coding method for coding an image (which may be a moving picture) or an image decoding method for decoding such an image is discussed in Non Patent Literature 1.

CITATION LIST

Patent Literature

Non Patent Literature

[Non Patent Literature 1] ISO/IEC 14496-10 "MPEG-4 Part 10: Advanced Video Coding"

SUMMARY

Technical Problem

However, there is a problem that the image coding method or image decoding method according to conventional art has insufficient coding efficiency.

In view of this, the present disclosure provides an image coding method and an image decoding method which have increased coding efficiency.

Solution to Problem

An image coding method according to an aspect of the present disclosure is an image coding method of coding an input image including one or more transform blocks each having a luma component and a chroma component, the luma component being to be processed on the basis of a luma block which belongs to a current one of the one or more transform blocks and has the same size as a size of the current transform block, the chroma component being to be processed on the basis of a chroma block which belongs to the current one of the one or more transform blocks and has a size smaller than the size of the luma block, and the coding method including: deriving coefficients of the luma component by performing transform on the luma component and deriving coefficients of the chroma component by performing transform on the chroma component; and coding the coefficients of the luma component and the coefficients of the chroma component, wherein in the deriving, when the size of the current transform block is a predetermined first minimum size, the coefficients of the chroma component are derived by performing the transform on the chroma component on the basis of a block resulting from binding a plurality of the chroma blocks, the resulting block having the same size as the size of the luma block, and in the coding, when the size of the current transform block is the first minimum size, a flag indicating whether or not the coefficients of the chroma component include a non-zero coefficient is not coded, and when the size of the current transform block is a size other than the first minimum size, the flag is coded.

An image decoding method according to an aspect of the present disclosure is an image decoding method of decoding, from a coded bitstream, an image including one or more transform blocks each having a luma component and a chroma component, the luma component being to be processed on the basis of a luma block which belongs to a current one of the one or more transform blocks and has the same size as a size of the current transform block, the chroma component being to be processed on the basis of a chroma block which belongs to a current one of the one or more transform blocks and has a size smaller than a size of the luma block, and the image decoding method including: decoding coefficients of the luma component and coefficients of the chroma component which are coded and included in the coded bitstream; and deriving the luma component by performing transform on the coefficients of the luma component and deriving the chroma component by performing transform on the coefficients of the chroma component, wherein in the deriving, when the size of the current transform block is a predetermined first minimum size, the coefficients of the chroma component are derived by performing the transform on the chroma component on the basis of a block resulting from binding a plurality of the chroma blocks, the resulting block having the same size as the size of the luma block, and in the decoding, when the size of the current transform block is a size other than the first minimum size, a flag indicating whether or not the coefficients of the chroma component include a non-zero coefficient is decoded.

The general or specific aspect may be implemented using a system, a method, an integrated circuit, a computer program, or a computer-readable recording medium such as a CD-ROM, or any combination of systems, methods, integrated circuits, computer programs, or computer-readable recording media.

Advantageous Effects

The image coding method and image decoding method according to the present disclosure enables coding with increased efficiency (a reduced amount of codes).

BRIEF DESCRIPTION OF DRAWINGS

These and other objects, advantages and features of the invention will become apparent from the following description thereof taken in conjunction with the accompanying drawings that illustrate a specific embodiment of the present invention.

FIG. 26 illustrates a structure of multiplexed data.

FIG. 29 shows a structure of TS packets and source packets in the multiplexed data.

FIG. 37 shows an example of a look-up table in which video data standards are associated with driving frequencies.

DESCRIPTION OF EMBODIMENTS

Figure 1:
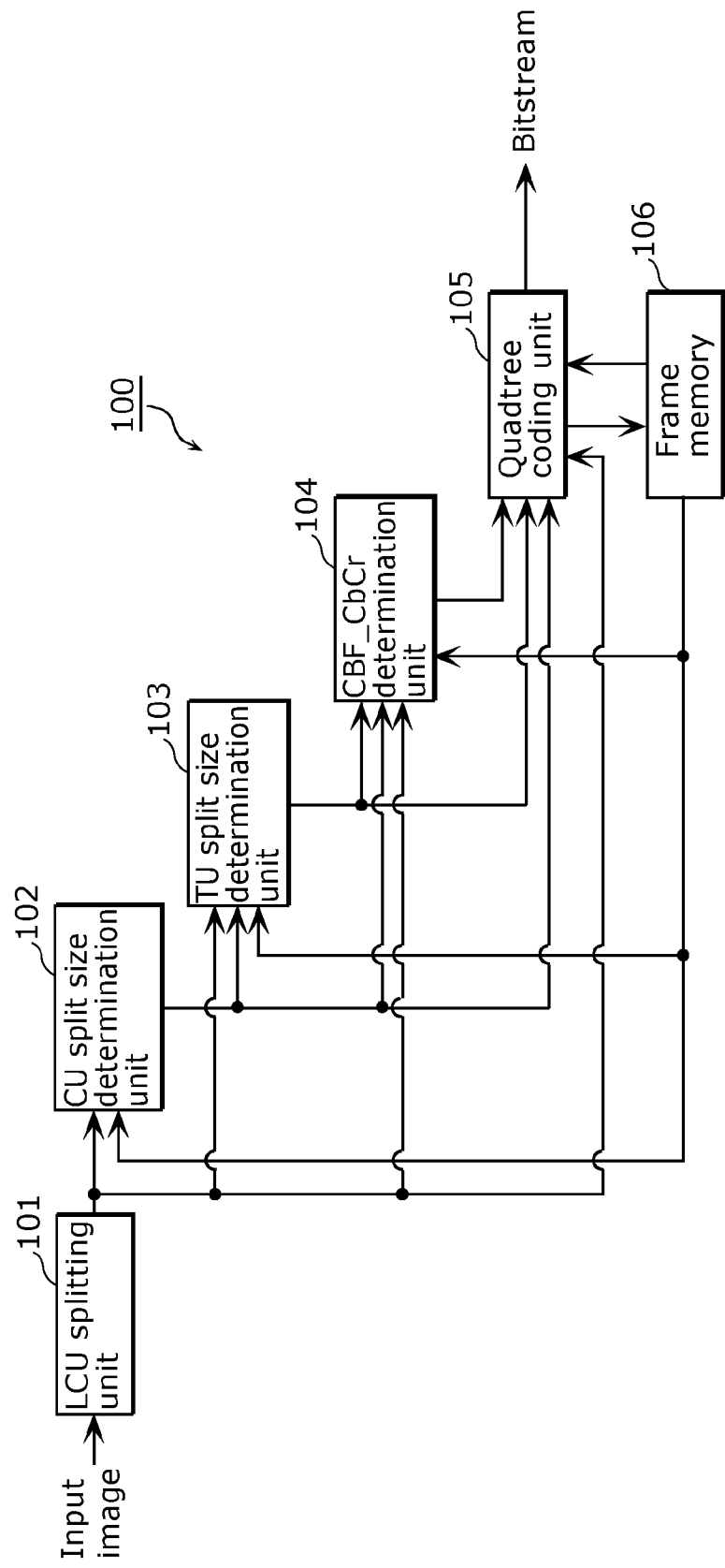
FIG. 1 is a block diagram showing an example of a configuration of an image coding apparatus in Embodiment 1.

Embodiment 1
(Underlying Knowledge Forming Basis of the Present Disclosure)

The inventors have found that there is the following problem with the image coding method for coding an image and image decoding method for decoding an image described in the section of "Background Art".

In recent years, techniques for use in digital video equipment have advanced significantly, so that there are more and more occasions to perform compression coding on video signals (time-series pictures for a moving picture) input from a camcorder or a television tuner to record them on recording media such as a Digital Versatile Disc (DVD) or a hard disk or to distribute them through a network.

Such an image coding method for video coding generally includes the following steps: generating a prediction image of a current image to be coded; calculating a difference image between the prediction image and the current image; transforming the difference image from a picture domain into a frequency domain to obtain frequency coefficients (coefficients); and arithmetic-coding of the frequency coefficients.

According to a standard for image coding referred to as H.264/AVC or MPEG-4 AVC (see Non Patent Literature 1), a current block to be coded is divided into one or more current blocks to be coded. Each of the current blocks to be coded is further divided into one or more transform blocks. The above-described obtaining of frequency coefficients is performed on each of the transform block. Furthermore, a parameter arithmetically coded in the above-described arithmetic-coding includes a flag indicating whether or not the transform block has a non-zero frequency coefficient. The flag is referred to as a Coded Block Pattern (CBP) in H.264/AVC, and a Coded Block Flag (CBF) in HEVC.

In decoding of an image, steps such as inverse frequency transform are performed on a transform block which has a flag having a value of 1.

However, there is a problem with the conventional technique that a flag needs to be coded for each transform block so that the amount of codes is large.

In order to solve the problem, provided is an image coding method according to an aspect of the present disclosure which is an image coding method of coding an input image including one or more transform blocks each having a luma component and a chroma component, the luma component being to be processed on the basis of a luma block which belongs to a current one of the one or more transform blocks and has the same size as a size of the current transform block, the chroma component being to be processed on the basis of a chroma block which belongs to the current one of the one or more transform blocks and has a size smaller than the size of the luma block, and the image coding method including: deriving coefficients of the luma component by performing transform on the luma component and deriving coefficients of the chroma component by performing transform on the chroma component; and coding the coefficients of the luma component and the coefficients of the chroma component, wherein in the deriving, when the size of the current transform block is a predetermined first minimum size, the coefficients of the chroma component are derived by performing the transform on the chroma component on the basis of a block resulting from binding a plurality of the chroma blocks, the resulting block having the same size as the size of the luma block, and in the coding, when the size of the current transform block is the first minimum size, a flag indicating whether or not the coefficients of the chroma component include a non-zero coefficient is not coded, and when the size of the current transform block is a size other than the first minimum size, the flag is coded.

In the image coding method in this configuration, when a block of chroma components is smaller than a block of a luma component, when a transform block has the first minimum size, blocks of a chroma component, which is smaller than a block of a luma component, are bound and processed on the basis of a block having the same size as the block of the luma component. This makes it no longer necessary to include processing circuitry, a software module, or the like for coding of blocks on the basis of a unit having a size smaller than the first minimum size.

Furthermore, in the image coding method in this configuration, coding of chroma components CBF_Cb and CBF_Cr is not performed on transform blocks having the first minimum size. In the image coding method in this configuration, CBF_Cb and CBF_Cr in the layer one level higher are referred to. Thus, CBF_Cb and CBF_Cr of transform blocks having the first minimum size are not referred to. Accordingly, it is not necessary to code CBF_Cb or CBF_Cr of transform blocks having the first minimum size, so that coding efficiency can be increased by omitting coding of CBF_Cb and CBF_Cr.

For example, the transform blocks may be blocks resulting from splitting a coding block in quadtree structure, second minimum size of the coding block may be limited to a size larger than the first minimum size, and in the coding, the flag may be coded when (1) the size of the current transform block is larger than the first minimum size and (2) the current transform block belongs to a layer at a highest level in the quadtree structure, or when the flag has a value of 1 in a layer one level higher in the quadtree structure than a layer to which the current transform block belongs.

In order to solve the problem, provided is an image decoding method according to an aspect of the present disclosure which is an image decoding method of decoding, from a coded bitstream, an image including one or more transform blocks each having a luma component and a chroma component, the luma component being to be processed on the basis of a luma block which belongs to a current one of the one or more transform blocks and has the same size as a size of the current transform block, the chroma component being to be processed on the basis of a chroma block which belongs to a current one of the one or more transform blocks and has a size smaller than a size of the luma block, and the image decoding method including: decoding coefficients of the luma component and coefficients of the chroma component which are coded and included in the coded bitstream; and deriving the luma component by performing transform on the coefficients of the luma component and deriving the chroma component by performing transform on the coefficients of the chroma component, wherein in the deriving, when the size of the current transform block is a predetermined first minimum size, the coefficients of the chroma component are derived by performing the transform on the chroma component on the basis of a block resulting from binding a plurality of the chroma blocks, the resulting block having the same size as the size of the luma block, and in the decoding, when the size of the current transform block is a size other than the first minimum size, a flag indicating whether or not the coefficients of the chroma component include a non-zero coefficient is decoded.

In the image decoding method in this configuration, when a transform block has the first minimum size, blocks of a chroma component, which is smaller than a block of a luma component, are bound and processed on the basis of a block having the same size as the block of the luma component. This makes it no longer necessary to include processing circuitry, a software module, or the like for decoding of blocks on the basis of a unit having a size smaller than the first minimum size.

Furthermore, in the image decoding method in this configuration, decoding of chroma components CBF_Cb and CBF_Cr are not performed on transform blocks having the first minimum size. In the image decoding method in this configuration, CBF_Cb and CBF_Cr in the layer one level higher are referred to. Thus, CBF_Cb and CBF_Cr of transform blocks having the first minimum size are not referred to. Accordingly, it is not necessary to code CBF_Cb or CBF_Cr of transform blocks having the first minimum size, so that even when a bitstream includes any of the flags, coding efficiency can be increased by omitting coding of CBF_Cb and CBF_Cr.

For example, the transform blocks may be blocks resulting from splitting a decoding block in quadtree structure, a second minimum size of the decoded block may be limited to a size larger than the first minimum size, and in the decoding, the flag may be decoded when (1) the size of the current transform block is larger than the first minimum size and (2) the current transform block belongs to a layer at a higher level in the quadtree structure, or when the flag has a value of 1 in a layer one level higher in the quadtree structure than a layer to which the current transform block belongs.

In order to solve the problem, provided is an image coding apparatus according to an aspect of the present disclosure which is an image coding apparatus which transforms a chroma component and a luma component of an input image and includes: processing circuitry; and storage accessible from the processing circuitry, the input image including one or more transform blocks each having a luma component and a chroma component, the luma component being to be processed on the basis of a luma block which is belongs to a current one of the one or more transform blocks and has the same size as a size of the current transform block, the chroma component being to be processed on the basis of a chroma block which is in a current one of the one or more transform blocks and has a size smaller than the size of the luma block, and the processing circuitry being configured to derive coefficients of the luma component by performing transform on the luma component and deriving coefficients of the chroma component by performing transform on the chroma component, and code the coefficients of the luma component and the coefficients of the chroma component, wherein when the size of the current transform block is a predetermined first minimum size, the processing circuitry is configured to derive the coefficients of the chroma component by performing the transform on the chroma component on the basis of a block resulting from binding a plurality of the chroma blocks, the resulting block having the same size as the size of the luma block, and when the size of the current transform block is the first minimum size, the processing circuitry is configured not to code a flag indicating whether or not the coefficients of the chroma component include a non-zero coefficient, and when the size of the current transform block is a size other than the first minimum size, the processing circuitry is configured to code the flag.

In order to solve the problem, provided is an image decoding apparatus according to an aspect of the present disclosure which is an image decoding apparatus which decodes an image from a coded bitstream and includes: processing circuitry; and storage accessible from the processing circuitry, the image including one or more transform blocks each having a luma component and a chroma component, the luma component being to be processed on the basis of a luma block which belongs to a current one of the one or more transform blocks and has the same size as a size of the current transform block, the chroma component being to be processed on the basis of a chroma block which is in a current one of the one or more transform blocks and has a size smaller than the size of the luma block, and the processing circuitry being configured to decode coefficients of the luma component and coefficients of the chroma component which are coded and included in the coded bitstream, and derive the luma component by performing transform on the coefficients of the luma component and deriving the chroma component by performing transform on the coefficients of the chroma component, wherein when the size of the current transform block is a predetermined first minimum size, the processing circuitry is configured to derive the coefficients of the chroma component by performing the transform on the chroma component on the basis of a block resulting from binding a plurality of the chroma blocks, the resulting block having the same size as the size of the luma block, and when the size of the current transform block is a size other than the first minimum size, the processing circuitry is configured to decode a flag indicating whether or not the coefficients of the chroma component include a non-zero coefficient.

In order to solve the problem, an image coding and decoding apparatus according to an aspect of the present disclosure includes the image coding apparatus and the image decoding apparatus.

Hereinafter, embodiments will be concretely described with reference to the drawings. Each of the embodiments described below is described as a general or a concrete example. The numerical values, shapes, materials, structural elements, the arrangement and connection of the structural elements, steps, the processing order of the steps etc. shown in the following exemplary embodiments are mere examples, and therefore do not limit the present disclosure. Therefore, among the structural elements in the following exemplary embodiments, structural elements not recited in any one of the independent claims are described as arbitrary structural elements.

In addition, the term "coding" in the following description may be used to mean "encoding".

[Embodiment 1]

An image coding apparatus and an image coding method in Embodiment 1 will be described below using FIG. 1 to FIG. 12.

(1-1. Overall Configuration)

Firstly, an overall configuration of the image coding apparatus in Embodiment 1 will be described on the basis of FIG. 1. FIG. 1 is a block diagram showing an example of a configuration of the image coding apparatus (in part) in Embodiment 1.

The image coding apparatus 100 in Embodiment 1 is an apparatus which performs frequency transform on chroma components and a luma component of an input image. The image coding apparatus 100 splits an input image into one or more coding blocks in a tree structure, and splits each of the coding blocks into one or more transform blocks in the tree structure. In Embodiment 1, a quadtree structure is used as an example of the tree structure.

As shown in FIG. 1, the image coding apparatus 100 includes an LCU splitting unit 101, a CU split size determination unit 102, a TU split size determination unit 103, a CBF_CbCr determination unit 104, a quadtree coding unit 105, and a frame memory 106 (an example of a storage device).

A detailed configuration (operation) of the LCU splitting unit 101, CU split size determination unit 102, TU split size determination unit 103, CBF_CbCr determination unit 104, and frame memory 106 will be described later in 1-3.

(1-2. Configuration of the Quadtree Coding Unit 105)

Figure 2:
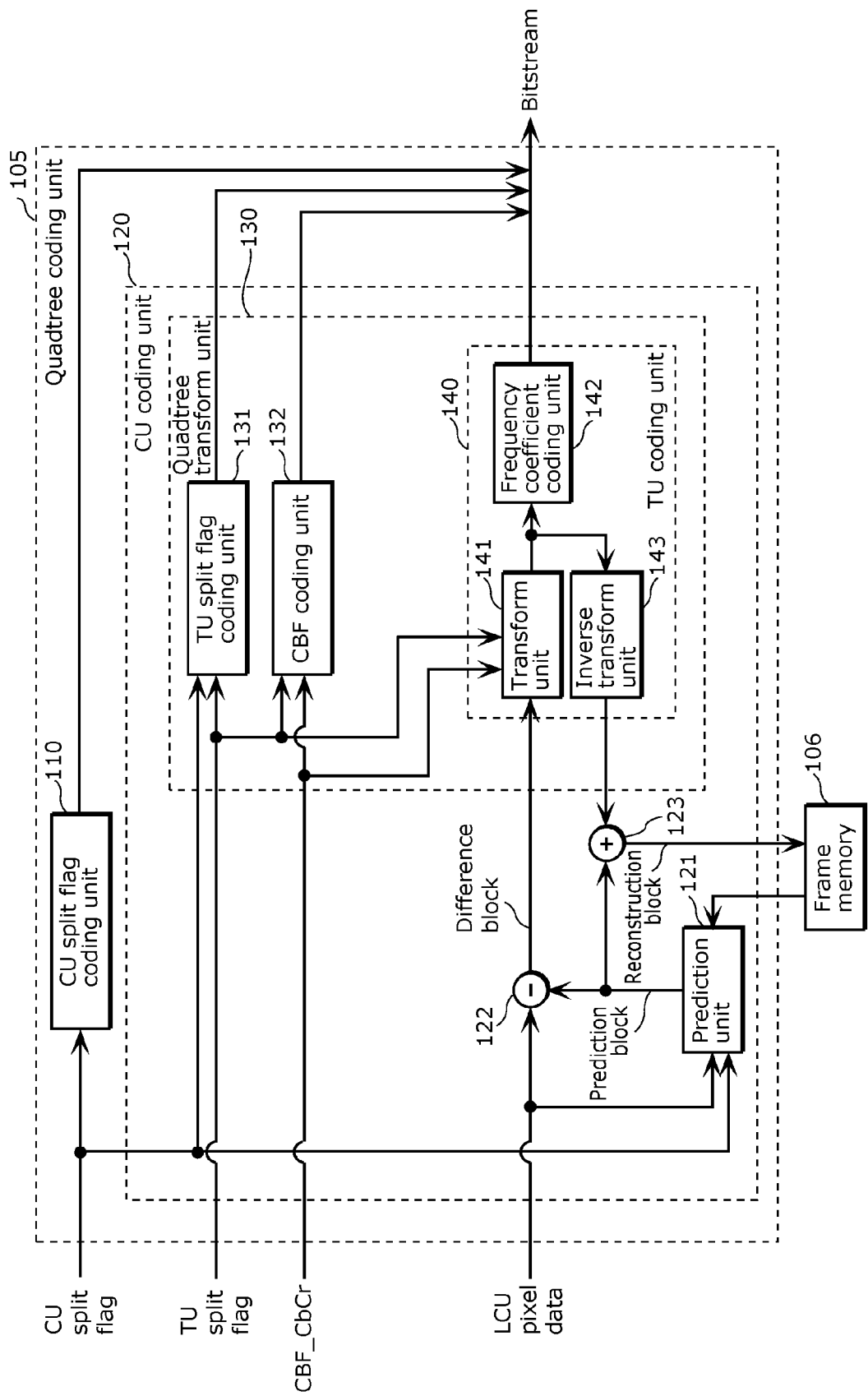
FIG. 2 is a block diagram showing an exemplary configuration of a quadtree coding unit in Embodiment 1.

A configuration of the quadtree coding unit 105 will be described below on the basis of FIG. 2. FIG. 2 is a block diagram showing an exemplary configuration of the quadtree coding unit 105.

As shown in FIG. 2, the quadtree coding unit 105 includes a CU split flag coding unit 110 and a CU coding unit 120.

The CU coding unit 120 includes a prediction unit 121, a subtractor 122, an adder 123, and a quadtree transform unit 130.

The quadtree transform unit 130 includes a TU split flag coding unit 131, a CBF coding unit 132, and a TU coding unit 140.

The TU coding unit 140 includes a transform unit 141, a frequency coefficient coding unit 142, and an inverse transform unit 143.

A detailed configuration (operation) of each component of the quadtree coding unit 105 will be described in subsections 1-4 to 1-7 below.

(1-3. Overall Operation)

Figure 3:
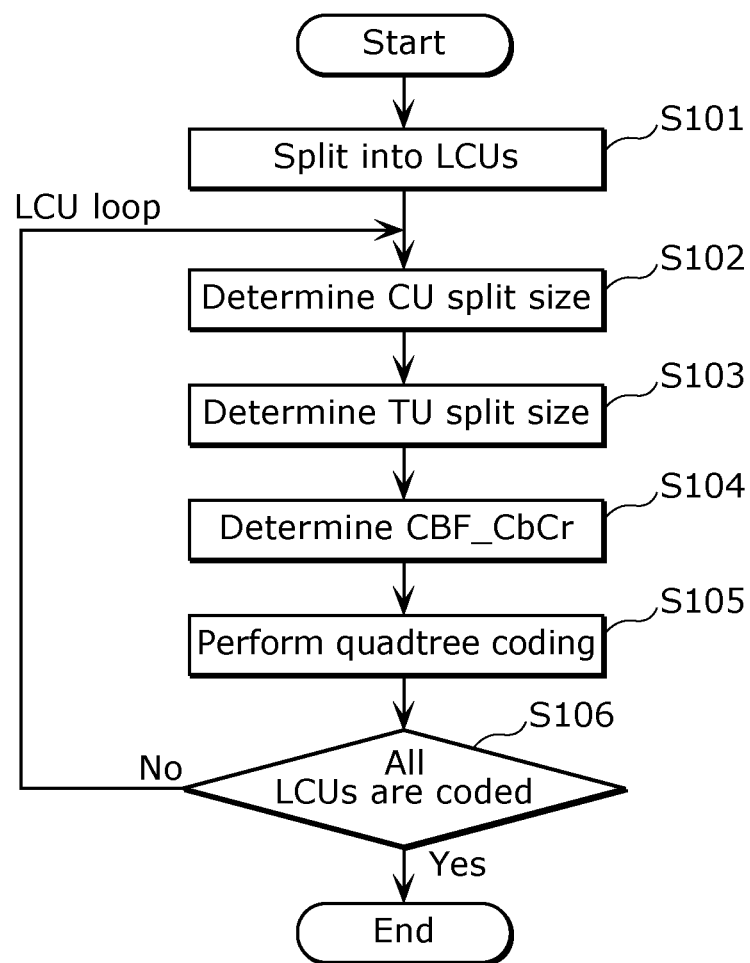
FIG. 3 is a flowchart showing an example of steps of an image coding method in Embodiment 1.

Overall operation of the image coding apparatus 100 will be described on the basis of FIG. 3. FIG. 3 is a flowchart showing an exemplary overall operation of the image coding apparatus 100.

As shown in FIG. 3, the LCU splitting unit 101 splits an input image into, for example, blocks having a size of 64×64 (largest coding units (LCUs)), and outputs the LCUs sequentially to the CU split size determination unit 102, the TU split size determination unit 103, the CBF_CbCr determination unit 104, and the quadtree coding unit 105 (Step S101). Subsequent steps of the processing (S102 to S106) for LCSs are to be performed on each LCU in each picture (input image), and thus the steps S102 to S106 are performed on all LCUs in each picture.

The CU split size determination unit 102 splits an LCU into one or more coding units (CUs) (S102). The size of the CUs is variable, and the CUs may have different sizes.

Figure 4:
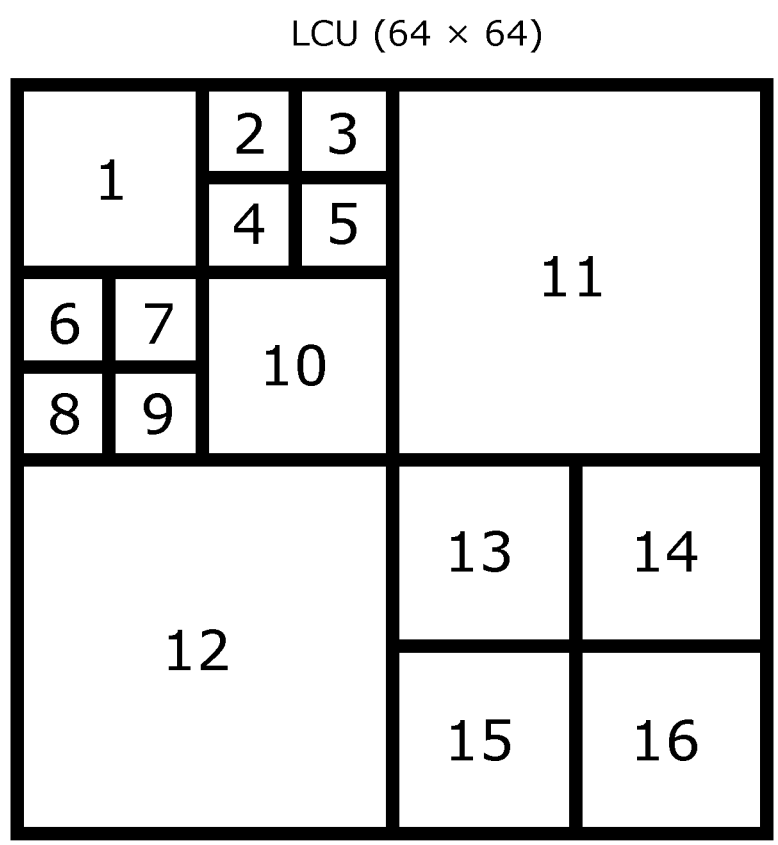
FIG. 4 shows an example of splitting of a largest coding unit (LCU) into coding units (CUs).

FIG. 4 shows an example of splitting of an LCU into one or more CUs. In FIG. 4, the whole block (the block including 1 to 16) is a single LCU. The blocks numbered 1 to 16 in FIG. 4 each represent a CU. The numbers in the blocks represent a coding order. The CU split size determination unit 102 determines CU split sizes based on features of already coded images or features of the input image. In Embodiment 1, the minimum size of CUs (a second minimum size) is 8 horizontal pixels×8 vertical pixels and the maximum size thereof is 64 horizontal×64 vertical pixels. CUs may have a maximum size or a minimum size other than the one above.

The CU split size determination unit 102 determines a value of a CU split flag to indicate a method of splitting the CU, and outputs the CU split flag to the quadtree coding unit 105. The CU split flag indicates whether or not the block is to be split.

Figure 5:
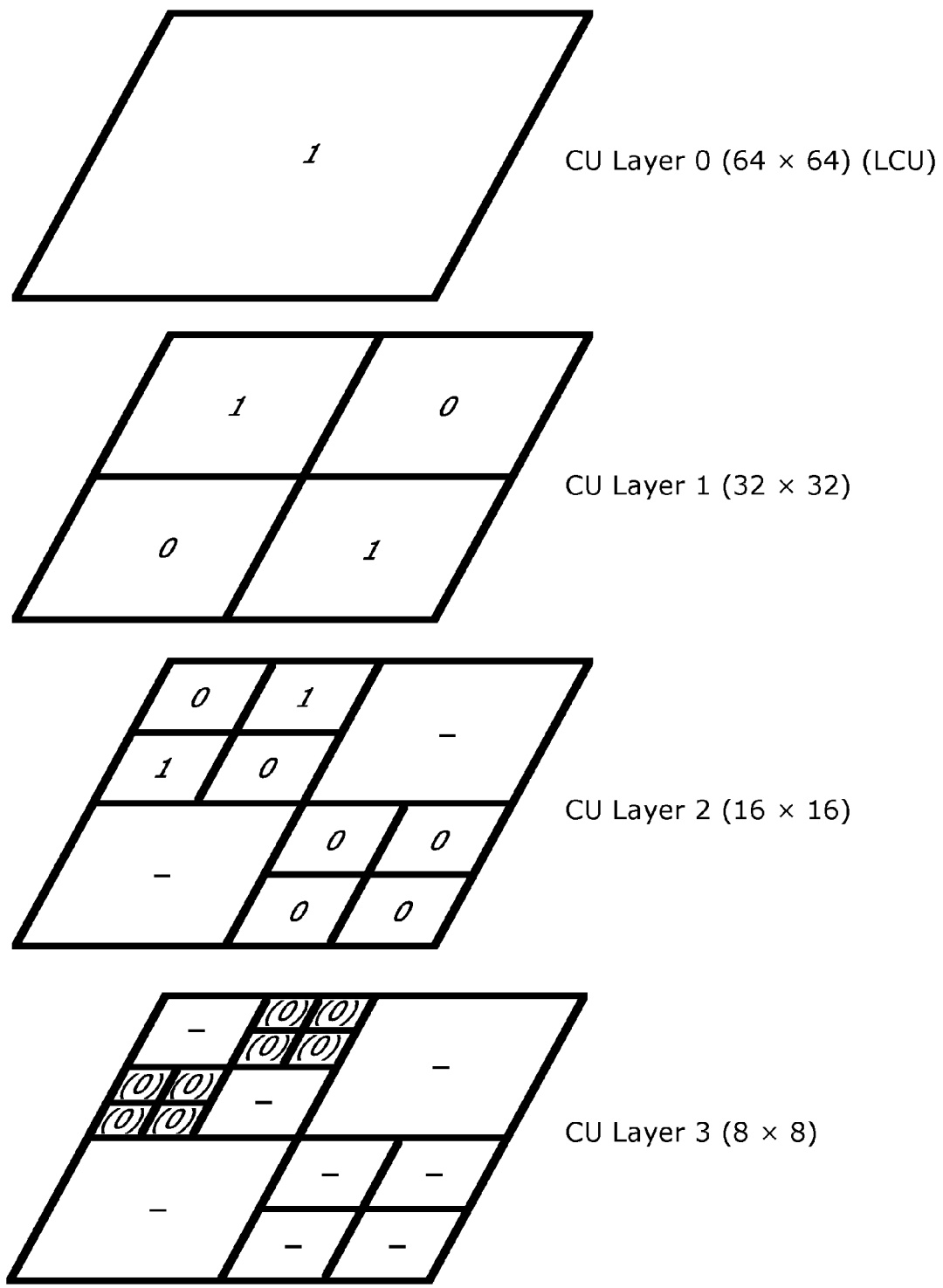
FIG. 5 shows an example of CU split flags corresponding to the LCU shown in FIG. 4.

FIG. 5 shows an example of values of CU split flags corresponding to the LCU shown in FIG. 4. In FIG. 5, the value in each square is the value of a CU split flag. The CU split flag having a value of 1 indicates that the block is to be split into quadrantal blocks, and the CU split flag having a value of 0 indicates that the block is not to be split. Each of the quadrantal blocks has a CU split flag therein. In other words, a block is recursively split while the block has a CU split flag having a value of 1 or while the CU size is larger than 8×8. CU Layer is a parameter indicating a level of splitting (the number of splitting). The larger the value of CU Layer is, the smaller the size of CUs is. In Embodiment 1, the maximum size of CUs is 64×64 and the minimum size is 8×8, and thus the value of CU Layer runs from 0 to 3. In FIG. 5, at the level where CU Layer has a value of 0, a CU split flag has a value of 1 indicating that the block is to be split. At the level where CU Layer has a value of 1, the CU split flags of the upper-right CU and the lower-left CU in FIG. 5 have a value of 0 indicating that the corresponding block is not to be split, and the CU split flags of the upper-left CU and the lower-right CU in FIG. 5 have a value of 1 indicating that the corresponding block is to be split. At the level where CU Layer has a value of 2, no CU split flag is set for the upper-right CU and the lower-left CU in FIG. 5. Furthermore, at the level where CU Layer has a value of 2, the upper-left four blocks and the lower-right four blocks in FIG. 5 each has a CU split flag having a setting value of 0 or 1. At the level where CU Layer has a value of 3, there are quadrantal blocks resulting from splitting the blocks each of which has a CU split flag having a value of 1 at the level where CU Layer has a value of 2. The quadrantal blocks have a CU size of 8×8. The CU size is the minimum size and the blocks are never to be split. Thus, the CU split flags of the blocks necessarily have a value of 0. Accordingly, CU split flags at the level where CUs have the minimum size need not be coded. Thus, in FIG. 5, the values of the CU split flags at the level where CU Layer has a value of 3 are denoted by parenthesized zero, that is, (0). A method of coding a CU split flag will be described in detail in subsection "1-4. Quadtree coding" below.

The TU split size determination unit 103 splits CUs into one or more transform units (TUs) (Step 103). The size of the TUs is variable, and the TUs may have different sizes.

Figure 6:
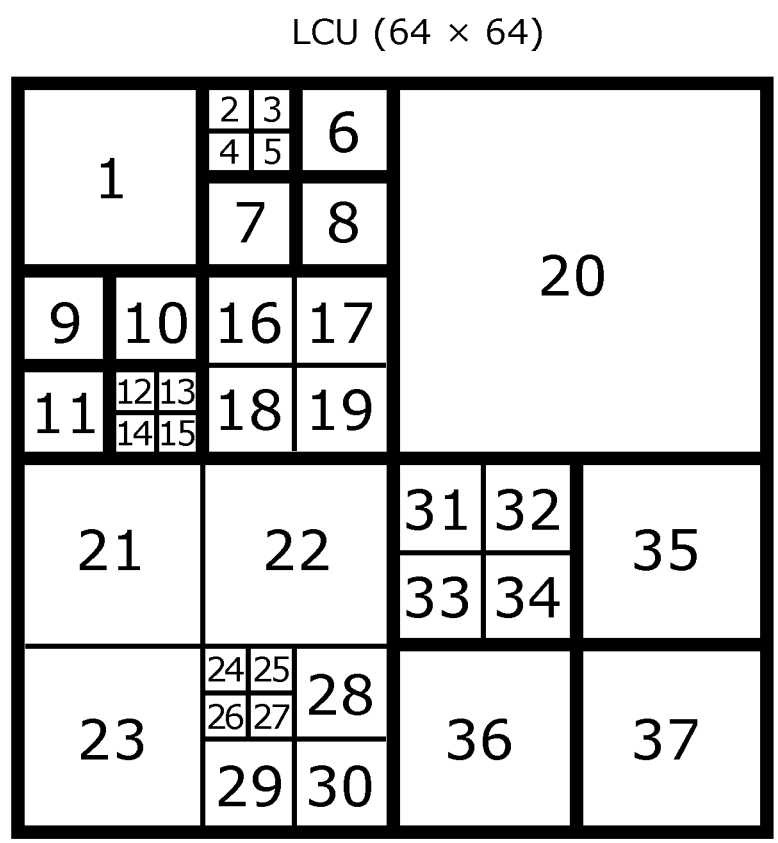
FIG. 6 shows an example of splitting of the LCU shown in FIG. 4 into TUs.

FIG. 6 shows an example of splitting of a LCU shown in FIG. 4 into one or more TUs. In FIG. 6, each thick-frame square represents a CU, and each thin-frame square represents a TU. The numbers in TUs represent a transform order. The TU split size determination unit 103 determines split sizes based on features of already coded images or features of the input image. In Embodiment 1, the minimum size of TUs (a first minimum size) is 4 horizontal pixels×4 vertical pixels, and the maximum size thereof is 64 horizontal×64 vertical pixels. TUs may have a maximum size or a minimum size other than the one above.

The TU split size determination unit 103 determines a value of a TU split flag to indicate a method of splitting the TU, and outputs the value to the quadtree coding unit 105. The TU split flag indicates whether or not the block is to be split.

Figure 7:
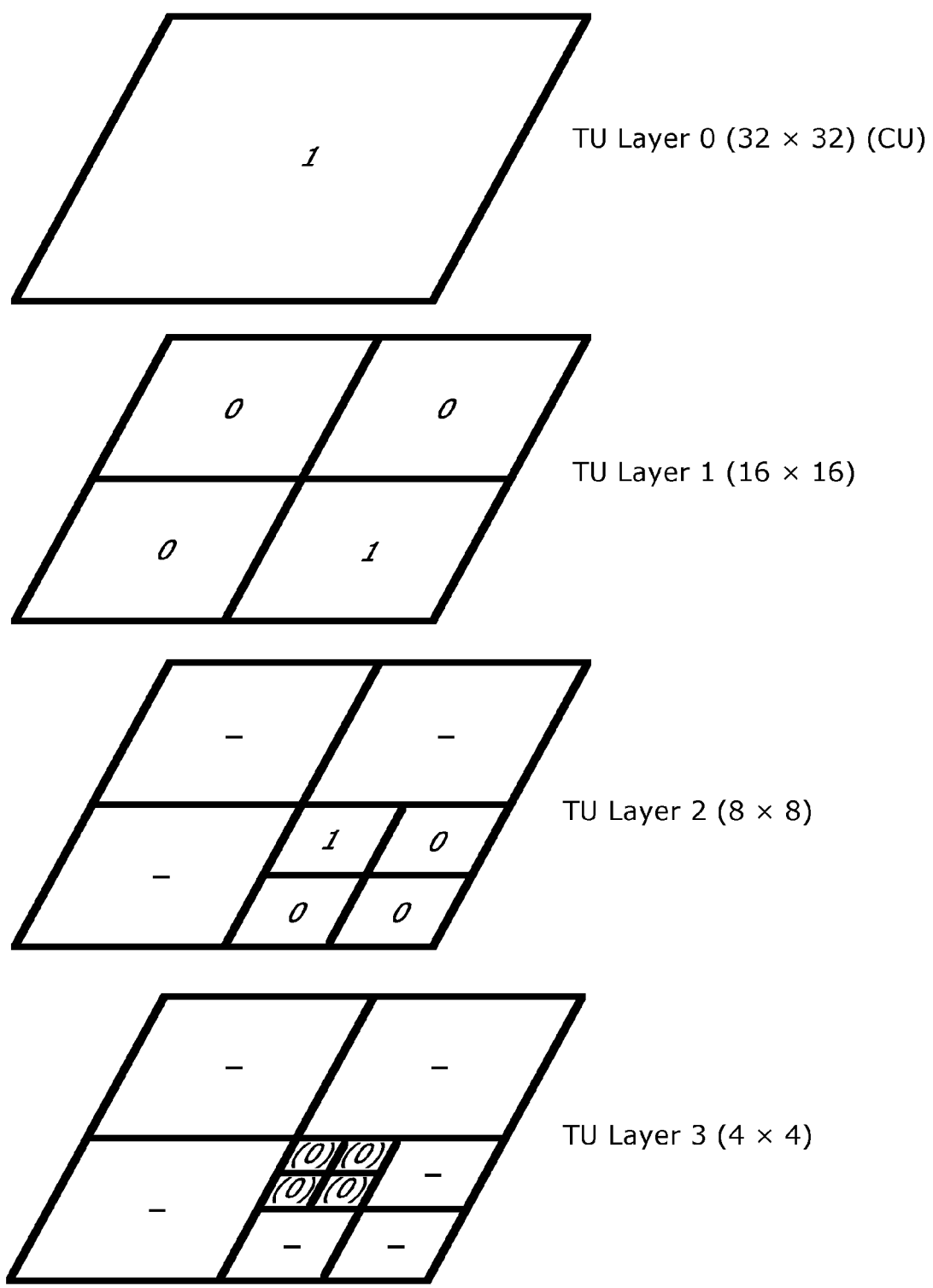
FIG. 7 shows an example of TU split flags corresponding to the LCU shown in FIG. 6.

FIG. 7 shows exemplary values of TU split flags in the case where the twelfth CU in the coding order shown in FIG. 4 is split into TUs in the manner shown in FIG. 6. In FIG. 7, the values in the squares denote the values of TU split flags. The TU split flag having a value of 1 indicates that the block is to be split into quadrantal blocks, and the TU split flag having a value of 0 indicates that the block is not to be split. Also the quadrantal blocks each include a TU split flag therein. In other words, blocks are recursively split while a TU split flag has a value of 1 or while the TU size is larger than 4×4. TU Layer is a parameter indicating a level of splitting (the number of splitting). The larger the value of TU Layer is, the smaller the size of TUs is. In Embodiment 1, in FIG. 7, the maximum size of CUs is 32×32 and the minimum size is 4×4, and thus the value of TU Layer runs from 0 to 3. In the example shown in FIG. 7, at the level where TU Layer has a value of 3, there are quadrantal blocks resulting from splitting the block which has a TU split flag having a value of 1 at the level where TU Layer has a value of 2. The quadrantal blocks have a TU size of 4×4. The TU size is the minimum size and the blocks are never to be split. Thus, the TU split flags of the blocks necessarily have a value of 0. Accordingly, TU split flags at the level where TUs have the minimum size need not be coded. Thus, the values of the TU split flags at the level where TU Layer has a value of 3 in FIG. 7 are denoted by parenthesized zero, that is, (0). A method of coding a TU split flag will be described in detail in subsection "1-6. Quadtree transform" below.

The blocks at the level where TU Layer has a value of 0 has a size of 32×32 in the example shown in FIG. 7 because the CU size is 32×32. This holds true also for the block numbered 11 in FIG. 4. Note that since the CUs numbered 2 to 9 in FIG. 4 has a size of 8×8, the blocks at the level where TU Layer has a value of 0 have a size of 8×8. Also note that since the CUs numbered 10 and 13 to 16 in FIG. 4 has a value of 16×16, the blocks at the level where TU Layer has a value of 0 have a size of 16×16.

The CBF_CbCr determination unit 104 determines CBF_Cb and CBF_Cr of each TU (S104). CBF_Cb and CBF_Cr are flags which indicate whether or not there is any frequency coefficient to be coded for chroma components (Cb, Cr). When there is any non-zero coefficient to be coded for Cb and Cr in a TU, CBF_Cb and CBF_Cr of the TU is respectively determined to be 1. When there is no non-zero coefficient to be coded in a TU (that is, all frequency coefficients of a TU are zero), CBF_Cb and CBF_Cr are determined to be 0. The values of CBF_Cb and CBF_Cr are each set based on frequency coefficients obtained by actually performing frequency transform on differences from a prediction image from a picture domain to a frequency domain.

Next, the quadtree coding unit 105 performs quadtree coding (S105). This will be described in detail later.

(1-4. Operation (Quadtree Coding))

Figure 8:
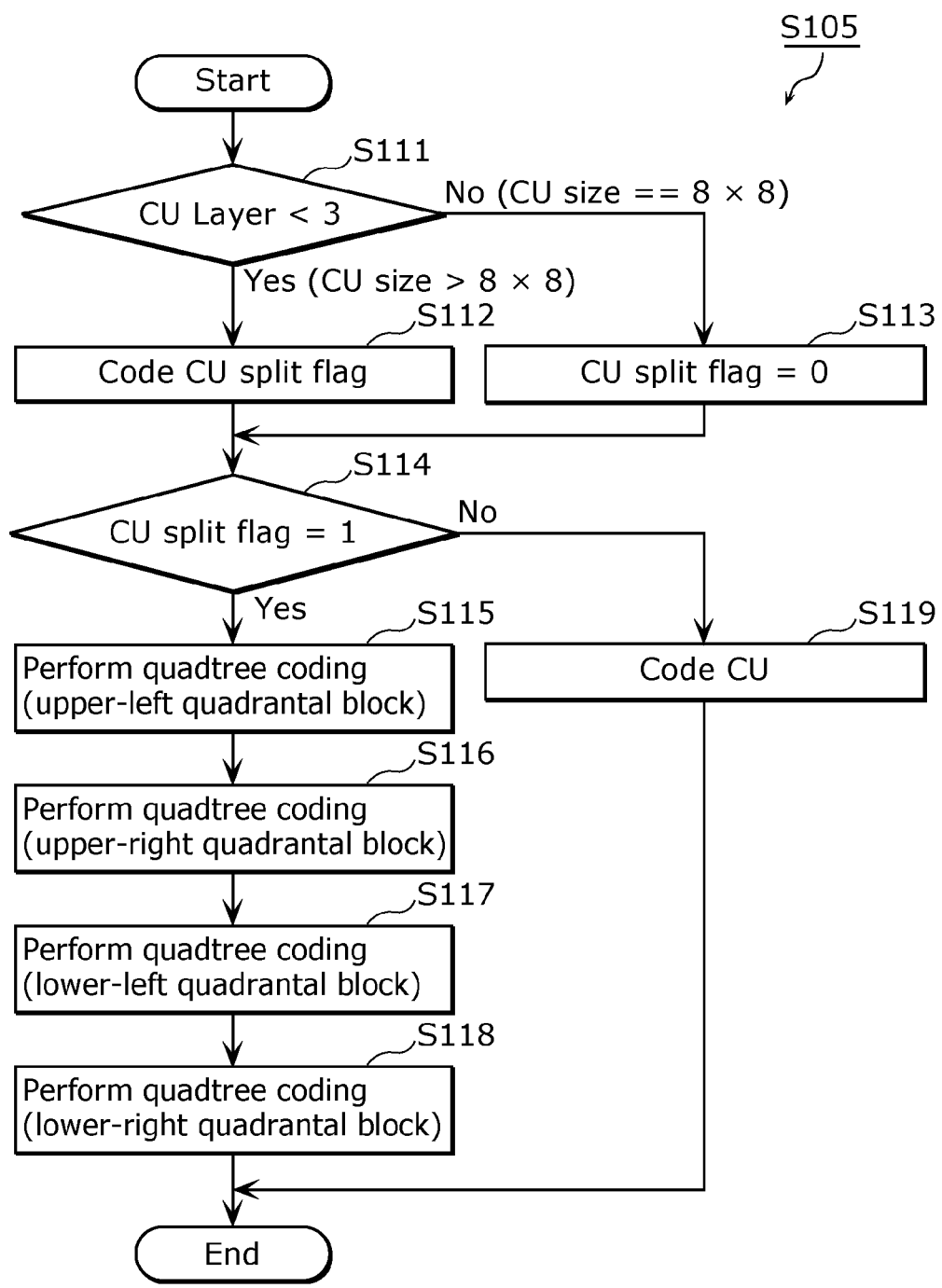
FIG. 8 is a flowchart showing an example of operation of a quadtree coding unit.

Operation of the quadtree coding unit 105 (details of operation in Step S105 in FIG. 3) will be described below on the basis of FIG. 8. FIG. 8 is a flowchart showing an example of steps in processing of quadtree coding.

For CU Layer having a value smaller than 3 (S111, Yes) in FIG. 5, the CU split flag coding unit 110 of the quadtree coding unit 105 codes a CU split flag (S112). For CU Layer having a value of 3 (S111, No), the CU split flag coding unit 110 sets the CU split flag to have a value of 0 without performing coding thereon (S113).

Note that the CU size at the levels where CU Layer has a value smaller than 3 in FIG. 5 is 16×16 or larger, and that the CU size at the level where CU Layer has a value of 3 is 8×8 or larger. CU Layer never has a value of four or greater because the CU size of 8×8 is the minimum size. In other words, a CU having a size of 8×8 is never to be split, and thus the CU split flag coding unit 110 sets a CU split flag to have a value of 0 without performing coding thereon.

When a CU split flag has a value of 0 (S114, No), the CU coding unit 120 performs CU coding (S119). This will be described in detail later. When a CU split flag has a value of 1 (S114, Yes), the CU coding unit 120 splits the block into quadrantal blocks. Then, the CU coding unit 120 recursively performs this processing of quadtree coding on each of the quadrantal blocks (S115 to S118).

(1-5. Operation (CU Coding))

Figure 9:
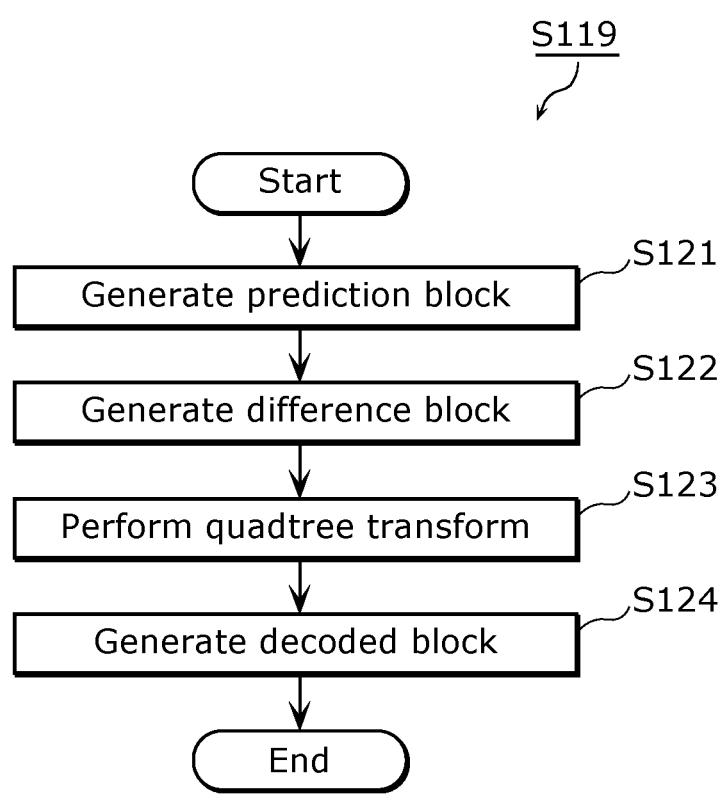
FIG. 9 is a flowchart showing an example of operation of a CU coding unit of the quadtree coding unit shown in FIG. 3.

Operation of the CU coding unit 120 (details of operation in Step S119 in FIG. 8) will be described below on the basis of FIG. 9. FIG. 9 is a flowchart showing an example of steps in processing of CU coding.

The prediction unit 121 of the CU coding unit 120 generates a prediction block from a current CU to be coded (current CU) and a decoded image stored in the frame memory 106 (S121).

The subtractor 122 generates a difference block from the current CU and a prediction block generated by the prediction unit 121 (S122).

The quadtree transform unit 130 performs frequency transform, coding, and inverse frequency transform on frequency coefficients for the difference block generated by the subtractor 122 (S123). The difference block is reconstructed through the inverse frequency transform (a reconstruction difference block is generated). This will be described in detail later.

The adder 123 generates a reconstruction block by adding the reconstruction difference block reconstructed by the quadtree transform unit 130 performing the inverse frequency transform and the prediction block generated by the prediction unit 121, and stores the reconstruction block in the frame memory 106 (S124).

(1-6. Operation (Quadtree Transform))

Figure 10:
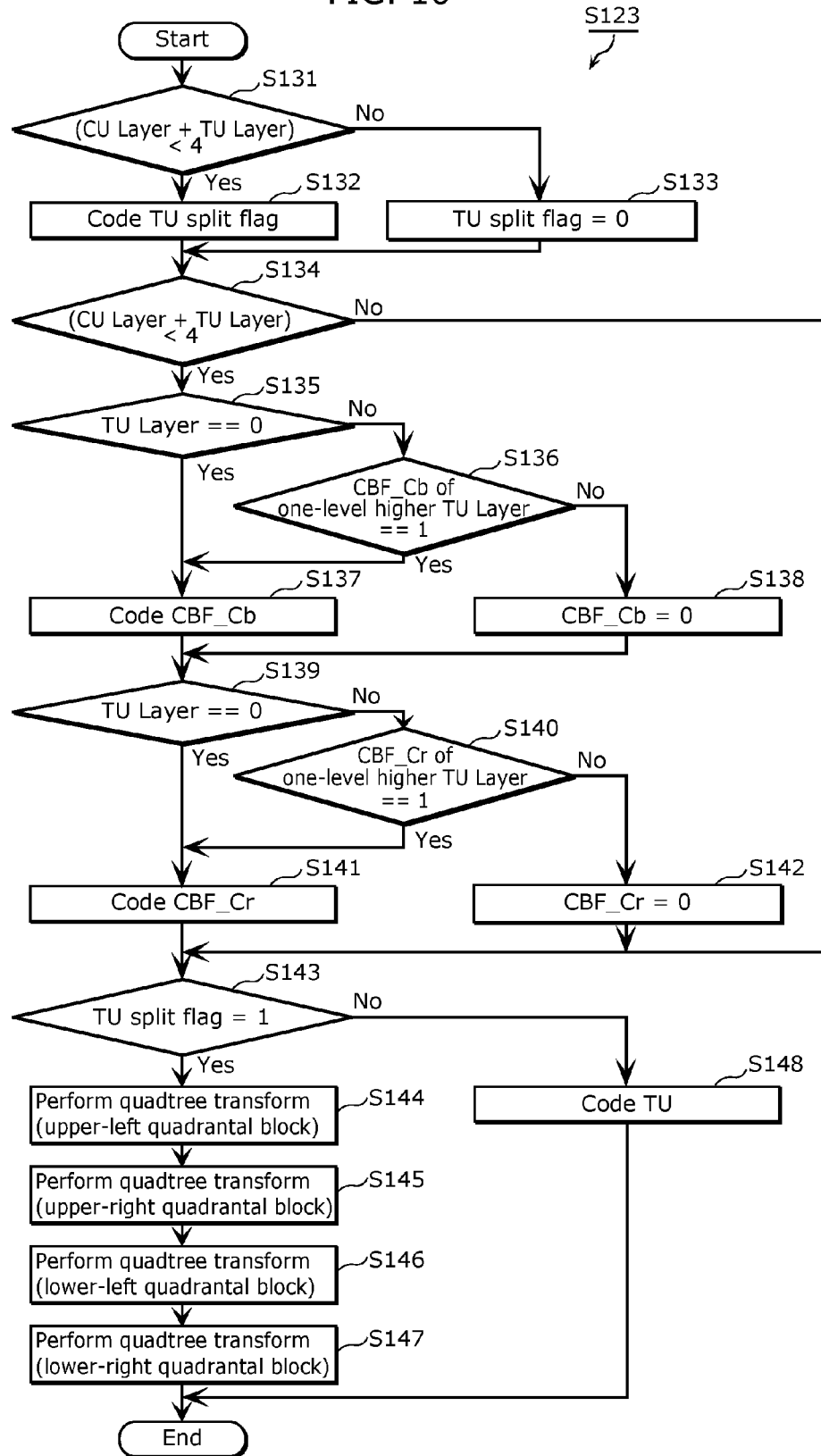
FIG. 10 is a flowchart showing an example of operation of a quadtree transform unit of the CU coding unit shown in FIG. 3.

Operation of the quadtree transform unit 130 (details of operation in Step S123 in FIG. 9) will be described below on the basis of FIG. 10. FIG. 10 is a flowchart showing an example of steps in processing of quadtree transform.

When the sum of the value of CU Layer and the value of TU Layer is smaller than four (S131, Yes), the TU split flag coding unit 131 of the quadtree transform unit 130 codes the TU split flag (S132). When the sum of the value of CU Layer and the value of TU Layer is four (S131, No), the TU split flag coding unit 131 sets the TU split flag to have a value of 0 without coding the TU split flag (S133).

In this step, the TU split flag coding unit 131 determines whether or not a TU has a size of 4×4 for TU Layer of the current level. When a TU has a size of 4×4, coding of a TU split flag is not performed. The minimum size of TUs is 4×4, and thus a TU having a size of 4×4 is never to be split. Thus, when the size of TUs is 4×4, the TU split flag coding unit 131 sets a TU split flag to have a value of 0 without performing coding on the TU split flag.

The CU size can be determined from the value of CU Layer. However, the TU size cannot be determined only from the value of TU Layer. The value of CU Layer is also used to determine the TU size. Since the TU size of TU Layer depends on the CU size of CU Layer at a level where TU Layer has a value of 0, the TU size can be determined by adding the value of CU Layer and the value of TU Layer. When the sum of the value of CU Layer and the value of TU Layer is zero, the TU size is 64×64. When the sum is four, the TU size is 4×4. Since the TU size of 4×4 is the minimum size, the sum is always below five.

When the sum of the value of CU Layer and the value of TU Layer is smaller than four (that is, when the TU size for TU Layer at the current level is larger than 4×4) (S134, Yes), the CBF coding unit 132 codes CBF_Cb and CBF_Cr (S135 to S142). When the sum of the value of CU Layer and the value of TU Layer is four (that is, when the TU size for TU Layer at the current level is 4×4), the CBF coding unit 132 does not code CBF_Cb or CBF_Cr. The reason for not coding CBF_Cb or CBF_Cr when the TU size of TU Layer at the current level is 4×4 will be described in the following subsection in which processing flow of TU coding will be described.

When TU Layer has a value of 0 (S135, Yes) or when TU Layer does not have a value of 0 and CBF_Cb for TU Layer one level higher has a value of 1 (S135, No; and S136, Yes), the CBF coding unit 132 codes CBF_Cb (S137). When TU Layer does not have a value of 0 and CBF_Cb for TU Layer one level higher does not have a value of 1 (S135, No; and S136, No), the CBF coding unit 132 sets CBF_Cb to have a value of 0 (S138).

Furthermore, when TU Layer has a value of 0 (S139, Yes) or when TU Layer does not have a value of 0 and CBF_Cr for TU Layer one level higher has a value of 1 (S139, No; and S140, Yes), the CBF coding unit 132 codes CBF_Cr (S141). When TU Layer does not have a value of 0 and CBF_Cb for TU Layer one level higher does not have a value of 1 (S139, No; and S140, No), the CBF coding unit 132 sets CBF_Cr to have a value of 0 (S142).

In other words, the CBF coding unit 132 codes CBF_Cb (or CBF_Cr) only when TU Layer has a value of 0 (TU Layer at the highest level) or when CBF_Cb (or CBF_Cr) for TU Layer one level higher has a value of 1. When the coding is not performed, CBF_Cb (or CBF_Cr) is set to have a value of 0, and then the processing proceeds to the following step. This means that coding of CBF is performed on a per layer basis. When CBF of a block for TU Layer one level higher has a value of 0, CBF of each of the quadrantal blocks for TU Layer at the current level is to have a value of 0.

When a TU split flag has a value of 0 (S143, No), the TU coding unit 140 performs TU coding (S148). This will be described in detail later.

When a TU split flag has a value of 1 (S143, Yes), the TU coding unit 140 splits the block into quadrantal blocks. Then, the TU coding unit 140 recursively performs this processing of quadtree transform on each of the quadrantal blocks (S144 to S147).

(1-7. Operation (TU Coding))

Figure 11:
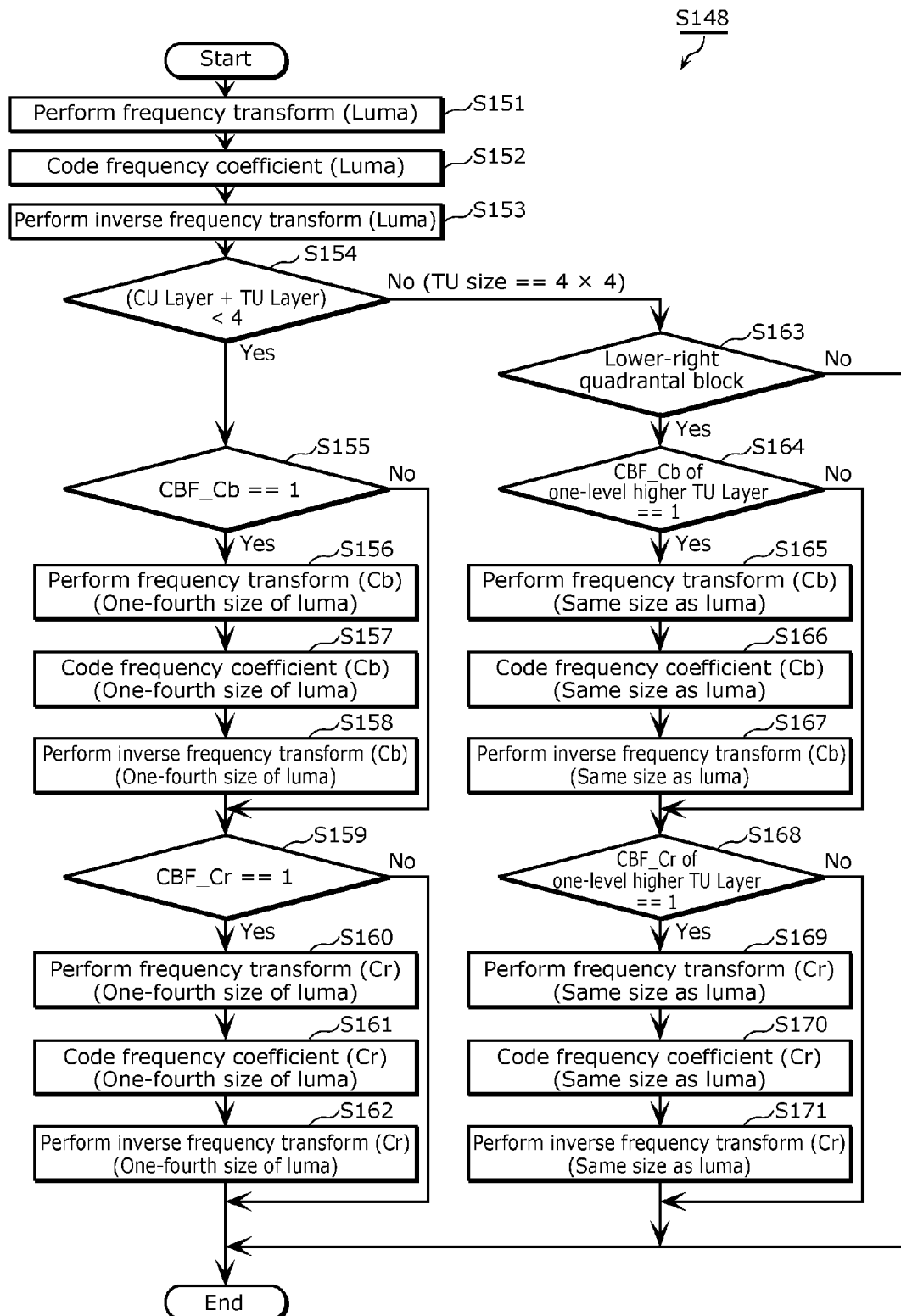
FIG. 11 is a flowchart showing an example of operation of a TU coding unit of the quadtree transform unit shown in FIG. 3.

Operation of the TU coding unit 140 (details of operation in Step S148 in FIG. 10) will be described below on the basis of FIG. 11. FIG. 11 is a flowchart showing an example of steps in processing of TU coding (part of the image coding method).

First, the TU coding unit 140 performs TU coding on a luma (brightness) component of an image (S151 to S153).

More specifically, the transform unit 141 of the TU coding unit 140 performs frequency transform on luma pixels of a TU to transform a luma component from a picture domain to a frequency domain to obtain frequency coefficients (S151). Furthermore, the frequency coefficient coding unit 142 codes the frequency coefficients resulting from the transforming by the transform unit 141 and outputs a code sequence (S152). The inverse transform unit 143 performs inverse frequency transform on the frequency coefficients resulting from the transforming by the transform unit 141 to transform the frequency coefficients from a frequency domain to a picture domain (S153).

Next, the TU coding unit 140 performs TU coding on chroma (color difference) components of the image (S154 to S171).

More specifically, when the sum of the value of CU Layer and the value of TU Layer is smaller than four (or when the TU size is larger than 4×4) (S154, Yes), the transform unit 141 moves on to Step S155.

When CBF_Cb has a value of 1 in Step S155 (S155, Yes), the transform unit 141 performs frequency transform on Cb component pixels in the TU (S156). The frequency coefficient coding unit 142 codes the frequency coefficients resulting from the transforming by the transform unit 141 and outputs a code sequence (S157). The inverse transform unit 143 performs inverse frequency transform on the frequency coefficients resulting from the transforming by the transform unit 141 (S158), and then moves on to Step S159.

When CBF_Cb has a value of 0 in Step S155, the TU includes no non-zero coefficient to be coded. Thus, the transform unit 141 (S155, No) moves on to Step S159.

When CBF_Cr 1 has a value of 1 in Step S159 (S159, Yes), the transform unit 141 performs frequency transform on Cr component pixels in the TU (S160). The frequency coefficient coding unit 142 codes the frequency coefficients resulting from the transforming by the transform unit 141 and outputs a code sequence (S161). The inverse transform unit 143 performs inverse frequency transform on the frequency coefficients resulting from the transforming by the transform unit 141 (S162). Assume that image is in 4:2:0 format, and therefore the number of Cb pixels and the number of Cr pixels are each one-fourth the number of luma pixels.

When CBF_Cr has a value of 0 in Step S159 (S159, No), the TU includes no non-zero coefficient to be coded. Thus, the transform unit 141 ends the processing on Cr.

When it is determined that the sum of the value of CU Layer and the value of TU Layer is four (or when the TU size is 4×4) in Step S154 (S154, No), the TU coding unit 140 performs frequency transform and coding (S164 to S171) only when the lower-right one of quadrantal blocks is the current TU (S163, Yes).

Hereinafter, this processing will be concretely described with reference to FIG. 6. In FIG. 6, the twenty-fourth to twenty-seventh TUs in transform order have a size of 4×4. When any of the twenty-fourth to twenty-sixth TUs in transform order is the current TU to be processed, the TU coding unit 140 does not perform frequency transform or coding on Cb or Cr. Instead, the TU coding unit 140 processes Cb of the twenty-fourth to twenty-seventh TUs in transform order at once when the twenty-seventh TU is the current TU to be processed. The TU coding unit 140 processes Cr in the same manner. In other words, the TU coding unit 140 binds Cb pixels in the twenty-fourth to twenty-seventh TUs in transform order to form a 4×4-pixel block when the twenty-seventh TU is the current TU to be processed, and performs frequency transform and coding on the 4×4-pixel block. The TU coding unit 140 performs frequency transform and coding on Cr pixels in the same manner.

This is because when Cb or Cr of a TU having a size of 4×4 is processed in the same manner as a luma component, frequency transform is performed on each 2×2-pixel block. When the image coding apparatus 100 is implemented as a circuit such as an LSI, the image coding apparatus 100 needs to include not only a circuit for 4×4-pixel frequency transform but also a circuit for 2×2-pixel frequency transform to perform the frequency transform on each 2×2-pixel block. When the image coding apparatus is implemented as a software program, it is necessary for the software program to include a module for 2×2-pixel frequency transform in addition to a module for 4×4-pixel frequency transform. Thus, such necessity of frequency transform of each 2×2-pixel block is eliminated by binding quadrantal blocks.

In other words, in Embodiment 1, quadrantal blocks are bound so that the frequency transform and coding on each chroma component are performed on pixels as few as pixels of the luma component on which frequency transform and coding are performed.

Since frequency transform and so on are performed on bound quadrantal blocks, the TU coding unit 140 determines, with reference to CBF_Cb for TU Layer one level higher, whether or not to perform the frequency transform and so on (S164). In an example shown in FIG. 6 and FIG. 7, the TU coding unit 140 refers to CBF_Cb for TU Layer having a value of 2 in order to make the determination for the twenty-fourth to twenty-seventh TUs in transform order.

Figure 12:
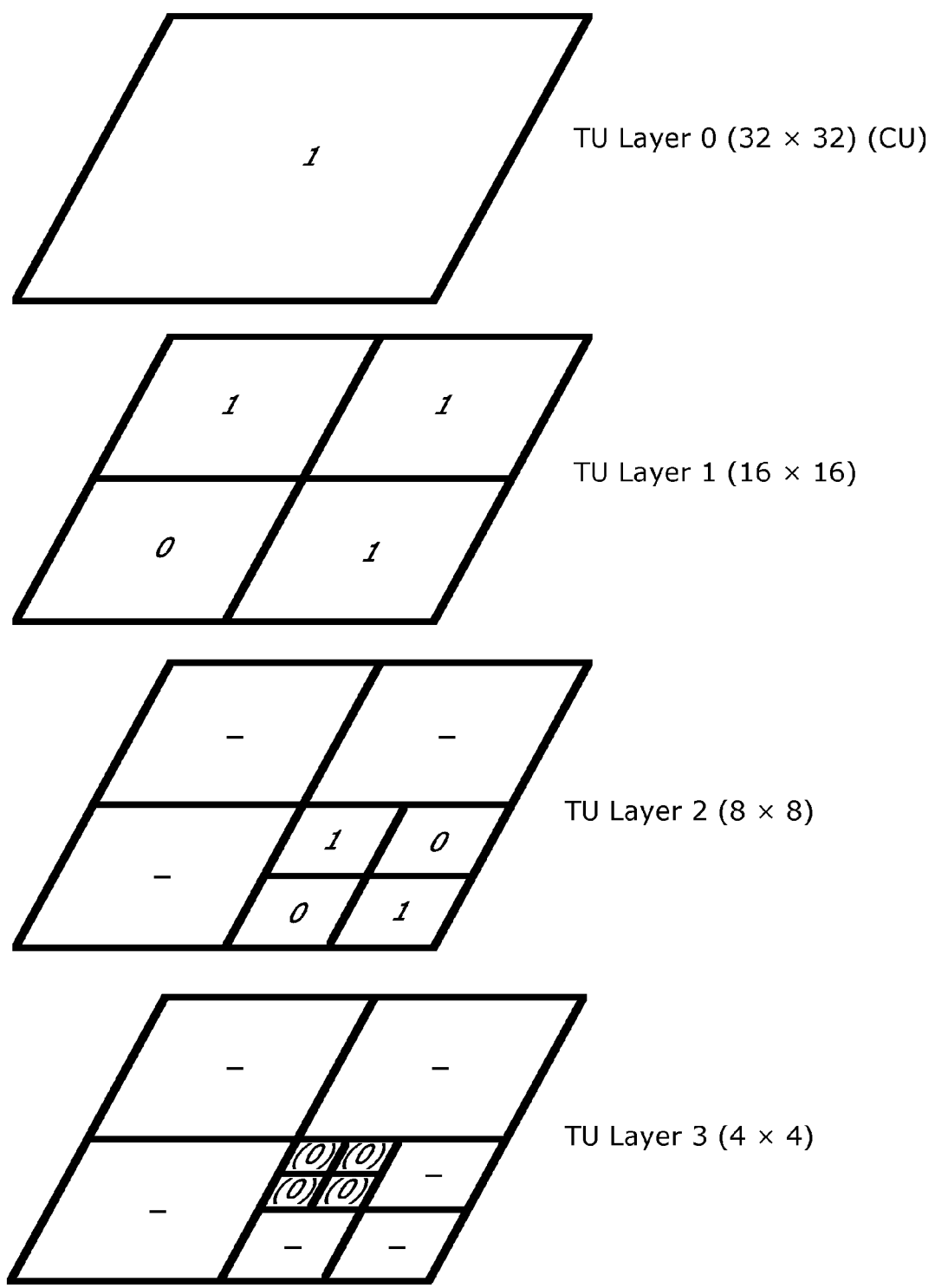
FIG. 12 shows an example of CBF_Cb corresponding to a TU in FIG. 7.

FIG. 12 shows an example of CBF_Cb corresponding to a TU in FIG. 7. In the case of the twenty-fourth to twenty-seventh TUs in transform order shown in FIG. 6, CBF_Cb for TU Layer having a value of 2 has a value of 1. In this case, the TU coding unit 140 determines to perform frequency transform and so on (S164, Yes).

When the TU coding unit 140 determines to perform frequency transform and so on in Step S164, the transform unit 141 performs frequency transform on Cb (S165), the frequency coefficient coding unit 142 codes frequency coefficients (S166), and the inverse transform unit 143 performs inverse frequency transform (S167).

Similarly, the TU coding unit 140 determines, with reference to CBF_Cr for TU Layer one level higher, whether or not to perform frequency transform and so on (S168). When the TU coding unit 140 determines to perform frequency transform and so on in Step S168, the transform unit 141 performs frequency transform on Cr (S169), the frequency coefficient coding unit 142 codes frequency coefficients (S170), and the inverse transform unit 143 performs inverse frequency transform (S171).

Note that in Embodiment 1, since the TU coding unit 140 makes the determination with reference to CBF_Cb or CBF_Cr for TU Layer one level higher, the TU coding unit 140 never refers to CBF_Cb or CBF_Cr for TU Layer at a lower level where the TU size is 4×4. Thus, in quadtree transform shown in FIG. 10, CBF_Cb and CBF_Cr are not coded when the sum of the value of CU Layer and the value of TU Layer is four (or when the TU size of TU Layer at the current level is 4×4) (S134, No).

(1-8. Effects)

As described above, in Embodiment 1, CBF_Cb is coded only when CBF_Cb for TU Layer one level higher has a value of 1, and CBF_Cr is coded only when CBF_Cr for TU Layer one level higher has a value of 1. This configuration contributes to reduction in the amount of codes and computational complexity. In other words, when CBF_Cb for TU Layer at a certain level has a value of 0, CBF_Cb for TU Layer at lower levels need not be coded however small a TU of TU Layer at the lower levels is split into. The same applies to CBF_Cr. As a result, the amount of codes and computational complexity are reduced.

Furthermore, in Embodiment 1, when the TU size is 4×4, frequency transform of Cb and Cr is performed on the basis of bound quadrantal blocks. In other words, coding of CBF_Cb or CBF_Cr is not performed for TU Layer at a level where the TU size is 4×4. This enables reduction in circuit size of an arithmetic unit and the amount of codes. More specifically, frequency transform of chroma (Cb and Cr) components is also performed on the basis of bound quadrantal blocks so that the minimum size for the frequency transform can be 4×4. The image coding apparatus 100 thus no longer needs to include a circuit for 2×2-pixel frequency transform, so that the circuit size can be reduced. Furthermore, CBF_Cb or CBF_Cr for TU Layer at a level where the TU size is 4×4 is not necessary when four quadrantal blocks are bound as described above. Thus, the amount of codes can be reduced.

Furthermore, CBF_Cb and CBF_Cr are coded for TU Layer at the highest level, but CBF_Cb or CBF_Cr is not coded for TU Layer at a level where the TU size is 4×4 as described above. This conflict can be avoided by setting the minimum size of CUs larger than 4×4 so that TUs are always larger than 4×4 for TU Layer at the highest level. In other words, coding of CBF_Cb or CBF_Cr is performed upon the satisfaction of the following two conditions:

(1) TU Layer is at a level where TUs have a size larger than the minimum size; and (2) CBF_Cb or CBF_Cr for TU Layer at the highest level or for TU Layer one level higher has a value of 1.

In Embodiment 1, the minimum size of CUs is limited to 8×8 so that the condition (1) is satisfied.

In Embodiment 1, the TU size of TU Layer, which is determined from the sum of the value of CU Layer and the value of TU Layer, may be determined using any other method of determining a TU size. For example, the TU size may be determined by using another parameter or by counting the number of recursive executions of quadtree coding or quadtree transform.

Furthermore, although CBF is not used for a luma component in the foregoing description, whether or not to perform coding (including frequency transform and so on) may be determined using CBF as in the method for Cb and Cr components.

Furthermore, the above-described processing in which the TU split flag is not coded and is set to have a value of 0 (no split) when the TU size is the minimum size, is given as a non-limiting example. For example, in contrast to the foregoing description, the TU split flag may be processed in a manner such that when the TU size is larger than a predetermined maximum TU size, the split flag is not coded and is set to have, for example, a value of 1 indicating the TU is to be split.

Furthermore, the above-described processing in which Cb or Cr is processed on the basis of bound quadrantal blocks to omit frequency transform for 2×2 blocks when the TU size is 4×4, is given as a non-limiting example. For example, when the minimum TU size is set to 8×8, Cb or Cr may be processed on the basis of four bound quadrantal blocks to eliminate necessity of performing frequency transform for 4×4 blocks when the TU size is 8×8. Conditions for binding blocks for the processing may be adaptively set depending on a minimum TU size. In other words, a condition may be set such that quadrantal blocks are bound when the TU size is larger than 8×8. It is also possible that TUs having a minimum size, which is variable, are bound and processed.

Furthermore, the above-described processing in which frequency transform is performed in the quadtree coding unit 105 (1-7, Step S151 in FIG. 11), is given as a non-limiting example. For example, it is also possible to use a configuration in which a result of frequency transform performed in determining CBF_Cr and CBF_Cb by the CBF_CbCr determination unit 104 (1-3, Step S104 in FIG. 3) is stored in memory and is read to be used in frequency transform performed in coding of frequency coefficients by the quadtree coding unit 105 (the frequency coefficient coding unit 142, Step S152 in FIG. 11).

Furthermore, the above-described processing in which determining a CU splitting size (CU split size determination unit 102) and a TU splitting size (TU split size determination unit 103) using features of an already coded image or features of input image, is given as a non-limiting example. For example, a CU split size and a TU split size may be determined from the amount of codes based on frequency coefficients actually obtained as a result of frequency transform of a difference from a prediction image. Furthermore, the prediction information, difference blocks, and result of the frequency transform may be also used by the CBF_CbCr determination unit 104 or the quadtree coding unit 105.

Furthermore, the above-described processing in which the inverse transform unit 143 generates a reconstruction block by adding a reconstructed difference block and a prediction block separately from quadtree transform (1-6), is given as a non-limiting example. Generation of a reconstruction block and quadtree transform may be performed together. For example, a reconstruction block may be generated by adding a reconstructed difference block to a prediction block immediately after inverse frequency transform performed in quadtree transform.

The applicable sizes of an LCU include, but are not limited to 64×64, 32×32, 128×128, and a further smaller size or a further larger size.

The maximum CU size is not limited to 64×64, and the minimum CU size is not limited to 8×8. A CU may have any size smaller or larger than these sizes, as long as it is larger than the minimum TU size (for example, 4×4). Optionally, the size of a CU may be varied depending on the size of an LCU.

The maximum TU size is not limited to 64×64, and the minimum TU size is not limited to 4×4. A TU may have any size smaller or larger than these sizes, as long as the minimum CU size is larger than the minimum TU size (for example, 4×4). Optionally, the size of a TU may be varied depending on the size of an LCU.

Furthermore, the processing in Embodiment 1 may be implemented as software. The software may be distributed via download. The software may be also distributed via recording media such as a CD-ROM on which the software is recorded. This holds true also for other embodiments in the present Description.

[Embodiment 2]

An image decoding apparatus and an image decoding method in Embodiment 2 will be described below using FIG. 13 to FIG. 19.

(2-1. Overall Configuration)

Figure 13:
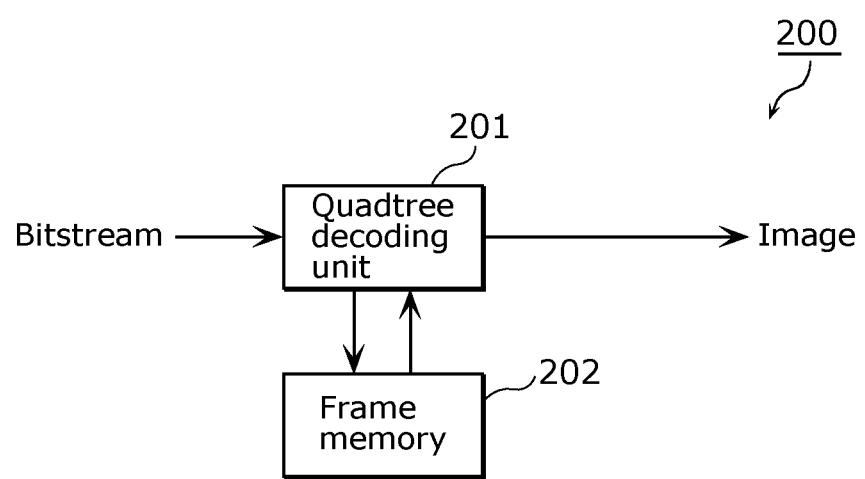
FIG. 13 is a block diagram showing an example of a configuration of an image decoding apparatus in Embodiment 2.

Firstly, an overall configuration of the image decoding apparatus in Embodiment 2 will be described on the basis of FIG. 13. FIG. 13 is a block diagram showing an example of a configuration of the image decoding apparatus (in part) in Embodiment 2.

As shown in FIG. 13, an image decoding apparatus 200 includes a quadtree decoding unit 201 and frame memory 202.

(2-2. Configuration of the Quadtree Decoding Unit)

Figure 14:
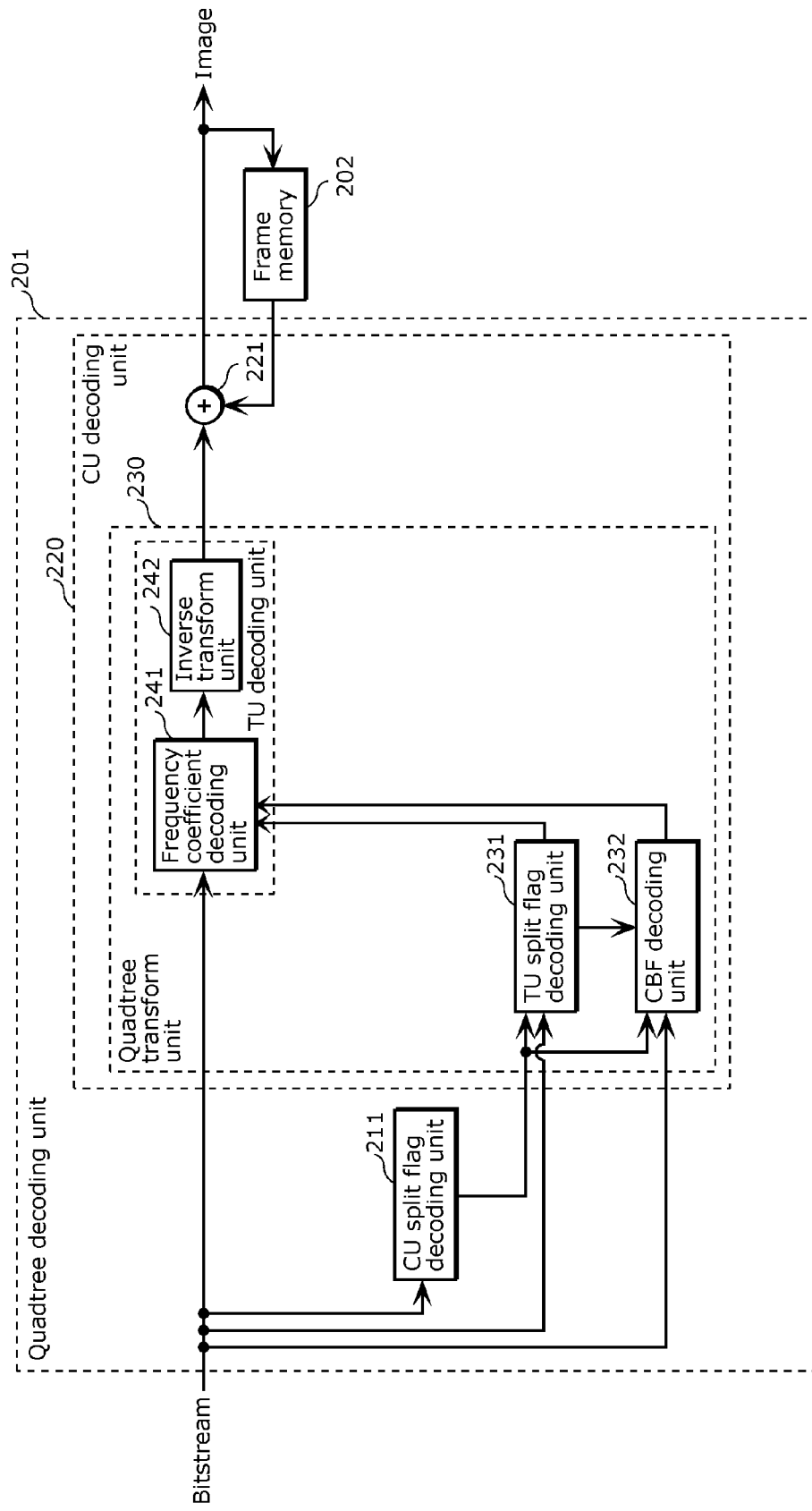
FIG. 14 is a block diagram showing an exemplary configuration of a quadtree decoding unit in Embodiment 2.

A configuration of the quadtree decoding unit 201 will be described below on the basis of FIG. 14. FIG. 14 is a block diagram showing an exemplary configuration of the quadtree decoding unit 201.

As shown in FIG. 14, the quadtree decoding unit 201 includes a CU split flag decoding unit 211 and a CU decoding unit 220.

The CU decoding unit 220 includes an adder 221 and a quadtree transform unit 230.

The quadtree transform unit 230 includes a TU split flag decoding unit 231, a CBF decoding unit 232, and a TU decoding unit 240.

The TU decoding unit 240 includes a frequency coefficient decoding unit 241 and an inverse transform unit 242.

A detailed configuration (operation) of each component of the quadtree decoding unit 201 will be described in subsections 2-3 to 2-7 below.

(2-3. Overall Operation)

Figure 15:
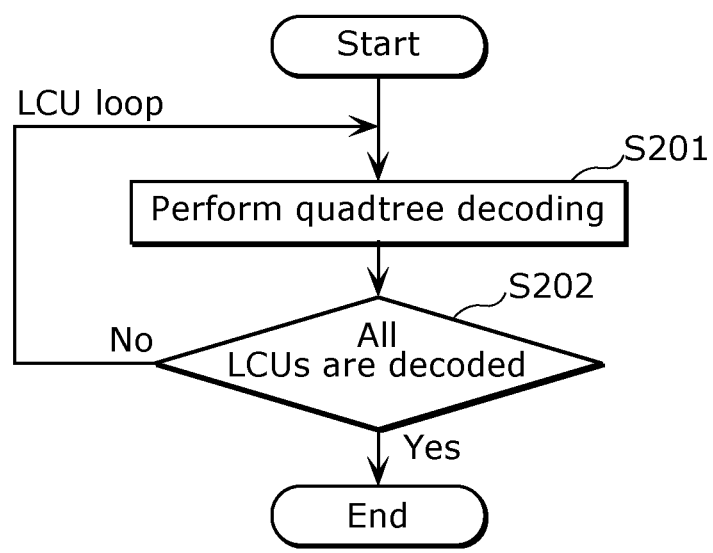
FIG. 15 is a flowchart showing an example of steps of an image decoding method in Embodiment 2.

Overall operation of the image decoding apparatus 200 will be described on the basis of FIG. 15. FIG. 15 is a flowchart showing an exemplary overall operation of the image decoding apparatus 200.

The quadtree decoding unit 201 performs quadtree decoding on a coded sequence as shown in FIG. 15 (Step 201). This will be described in detail later. This processing is performed on each LCU in each picture, and therefore these steps are performed by the repetition of the number of the LCUs in the picture (S202). In Embodiment 2, the LCU has a size of 64×64.

(2-4. Operation (Quadtree Decoding))

Figure 16:
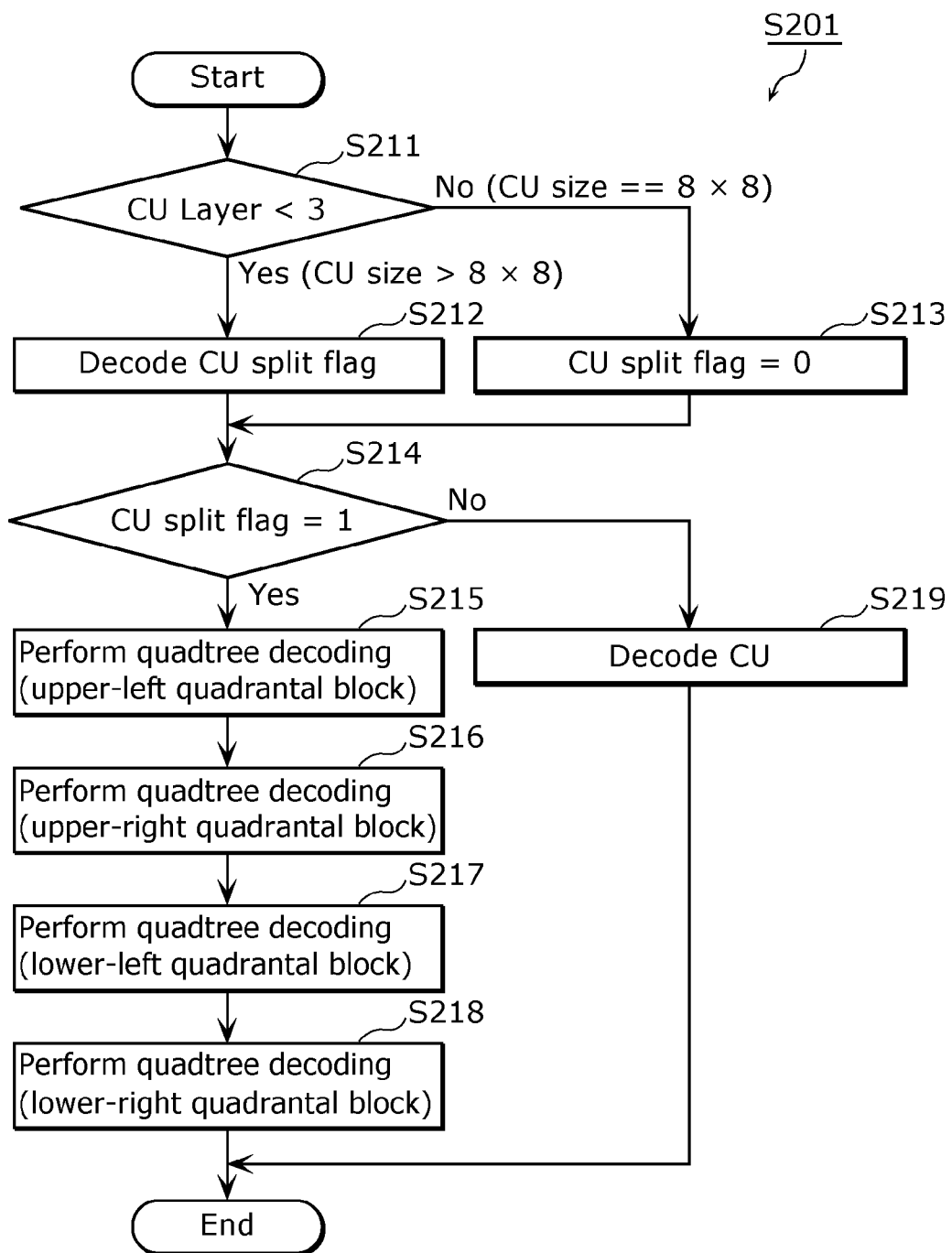
FIG. 16 is a flowchart showing an example of operation of a quadtree coding unit shown in FIG. 14.

Operation of the quadtree decoding unit 201 (details of operation in Step S201 in FIG. 15) will be described below on the basis of FIG. 16. FIG. 16 is a flowchart showing an example of steps in processing of quadtree decoding. Assume that in the following description, the same configurations of LCUs, CUs, and TUs as those in Embodiment 1 (FIGS. 4, 6, 5, 7, and 12) are used as an example.

For CU Layer having a value smaller than 3 (S211, Yes), the CU split flag decoding unit 211 of the quadtree coding unit 201 decodes a CU split flag (S212). For CU Layer having a value of 3 (S211, No), the quadtree decoding unit 201 sets the CU split flag to have a value of 0 without performing decoding thereon (S213).

As shown in FIG. 5, the CU size at the levels where CU Layer has a value smaller than 3 is 16×16 or larger, and the CU size at the level where CU Layer has a value of 3 is 8×8 or larger. CU Layer never has a value of 4 or greater because the CU size of 8×8 is the minimum size. In other words, a CU having a size of 8×8 is never to be split, and thus the CU split flag decoding unit 211 sets a CU split flag to have a value of 0 without performing decoding thereon.

When a CU split flag has a value of 0 (S214, No), the CU decoding unit 220 performs CU decoding (S219). This will be described in detail later. When a CU split flag has a value of 1 (S214, Yes), the CU decoding unit 220 splits the block into quadrantal blocks. Then, the CU decoding unit 220 recursively performs this processing of quadtree decoding on each of the quadrantal blocks (S215 to S218).

(2-5. Operation (CU Decoding))

Figure 17:
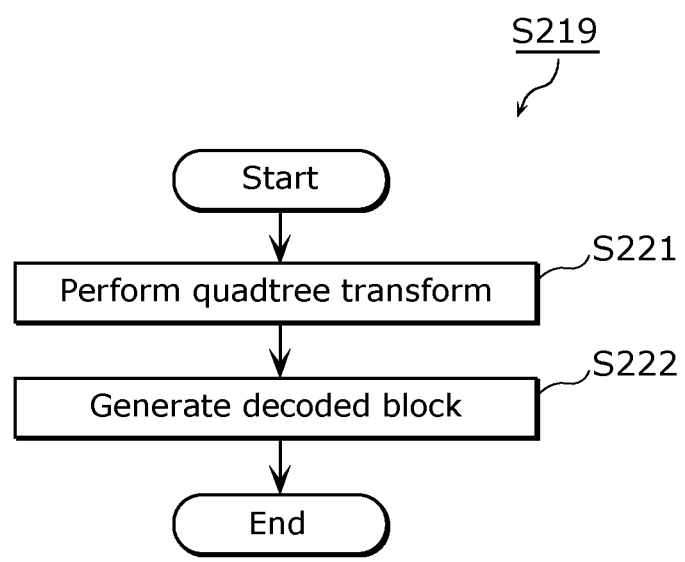
FIG. 17 is a flowchart showing an example of operation of a CU decoding unit shown in FIG. 14.

Operation of the CU decoding unit 220 (details of operation in Step S219 in FIG. 16) will be described below on the basis of FIG. 17. FIG. 17 is a flowchart showing an example of steps in processing of CU decoding.

The quadtree transform unit 230 performs quadtree transform (S221). In the quadtree transform, the TU decoding unit 240 performs decoding and inverse frequency transform on frequency coefficients. This will be described in detail later.

The adder 221 generates a decoded block by adding a difference block reconstructed by the quadtree transform unit 230 performing the inverse frequency transform and a prediction block generated from a decoded image stored in the frame memory 202, and stores the decoded block in the frame memory 202 (S222). Although not shown, the generating of a prediction block may be performed by a prediction unit provided between the frame memory 202 and the adder 221.

(2-6. Operation (Quadtree Transform))

Figure 18:
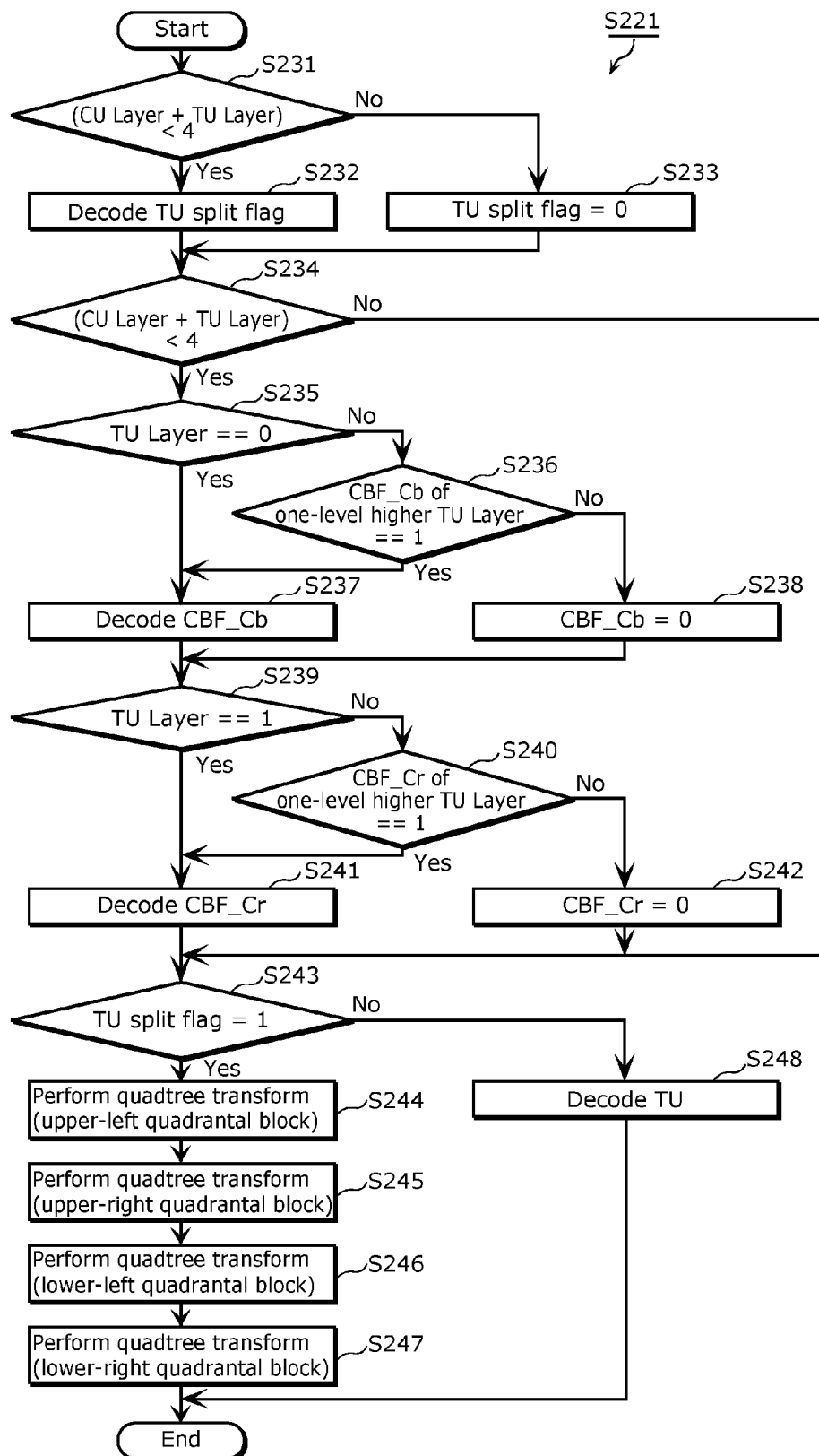
FIG. 18 is a flowchart showing an example of operation of a quadtree transform unit shown in FIG. 14.

Operation of the quadtree transform unit 230 (details of operation in Step S221 in FIG. 17) will be described below on the basis of FIG. 18. FIG. 18 is a flowchart showing an example of steps in processing of quadtree transform.

When the sum of the value of CU Layer and the value of TU Layer is smaller than four (S231, Yes), the TU split flag decoding unit 231 of the quadtree transform unit 230 decodes the TU split flag (S232). When the sum of the value of CU Layer and the value of TU Layer is four (S231, No), the TU split flag decoding unit 231 sets the TU split flag to have a value of 0 without decoding the TU split flag (S233).

In this step, the TU split flag decoding unit 231 determines whether or not a TU has a size of 4×4 for TU Layer at the current level. When a TU has a size of 4×4, decoding of a TU split flag is skipped. The minimum size of TUs is 4×4, and thus a TU having a size of 4×4 is never to be split. Thus, when the size of a TU is 4×4, the TU split flag decoding unit 231 sets a TU split flag to have a value of 0 without performing decoding on the TU split flag.

The CU size can be determined from the value of CU Layer. However, the TU size cannot be determined only from the value of TU Layer. The value of CU Layer is also necessary to determine the TU size. Since the TU size of TU Layer depends on the CU size of CU Layer at a level where TU Layer has a value of 0, the TU size can be determined by adding the value of CU Layer and the value of TU Layer. When the sum of the value of CU Layer and the value of TU Layer is zero, the TU size is 64×64. When the sum is four, the TU size is 4×4. Since the TU size of 4×4 is the minimum size, the sum is always below five.

When the sum of the value of CU Layer and the value of TU Layer is smaller than four (that is, when the TU size of the current TU Layer is larger than 4×4) (S234, Yes), the CBF decoding unit 232 decodes CBF_Cb and CBF_Cr (S235 to S242). When the sum of the value of CU Layer and the value of TU Layer is four (that is, when the TU size of TU Layer at the current level is 4×4) (S234, No), the CBF decoding unit 232 does not decode CBF_Cb or CBF_Cr. The reason for not decoding CBF_Cb or CBF_Cr when the TU size is 4×4 will be described in the following subsection in which processing flow of TU decoding will be described.

When TU Layer has a value of 0 (S235, Yes) or when TU Layer does not have a value of 0 and CBF_Cb for TU Layer one level higher has a value of 1 (S235, No; and S236, Yes), the CBF decoding unit 232 decodes CBF_Cb (S237). When TU Layer does not have a value of 0 and CBF_Cb for TU Layer one level higher does not have a value of 1 (S235, No; and S236, No), the CBF decoding unit 232 sets CBF_Cb to have a value of 0 (S238).

Furthermore, when TU Layer has a value of 0 (S239, Yes) or when TU Layer does not have a value of 0 and CBF_Cr for TU Layer one level higher has a value of 1 (S239, No; and S240, Yes), the CBF decoding unit 232 decodes CBF_Cr (S241). When TU Layer does not have a value of 0 and CBF_Cb for TU Layer one level higher does not have a value of 1 (S239, No; and S240, No), the CBF decoding unit 232 sets CBF_Cr to have a value of 0 (S242).

In other words, the CBF decoding unit 232 decodes CBF_Cb (or CBF_Cr) only when TU Layer has a value of 0 (TU Layer at the highest level) or when CBF_Cb (or CBF_Cr) of TU Layer one level higher has a value of 1. When the decoding is not performed, CBF_Cb (or CBF_Cr) is set to have a value of 0, and then the processing proceeds to the following step. This means that decoding of CBF is performed on a per layer basis. When CBF of a block of TU Layer one level higher has a value of 0, CBF of each of the quadrantal blocks of TU Layer at the current level is to have a value of 0.

When a TU split flag has a value of 0 (S243, No), the TU decoding unit 240 performs TU decoding (S248). This will be described in detail later.

When a TU split flag has a value of 1 (S243, Yes), the TU decoding unit 240 splits the block into quadrantal blocks. Then, the TU decoding unit 240 recursively performs this processing of quadtree transform on each of the quadrantal blocks (S244 to S247).

(2-7. Operation (TU Decoding))

Figure 19:
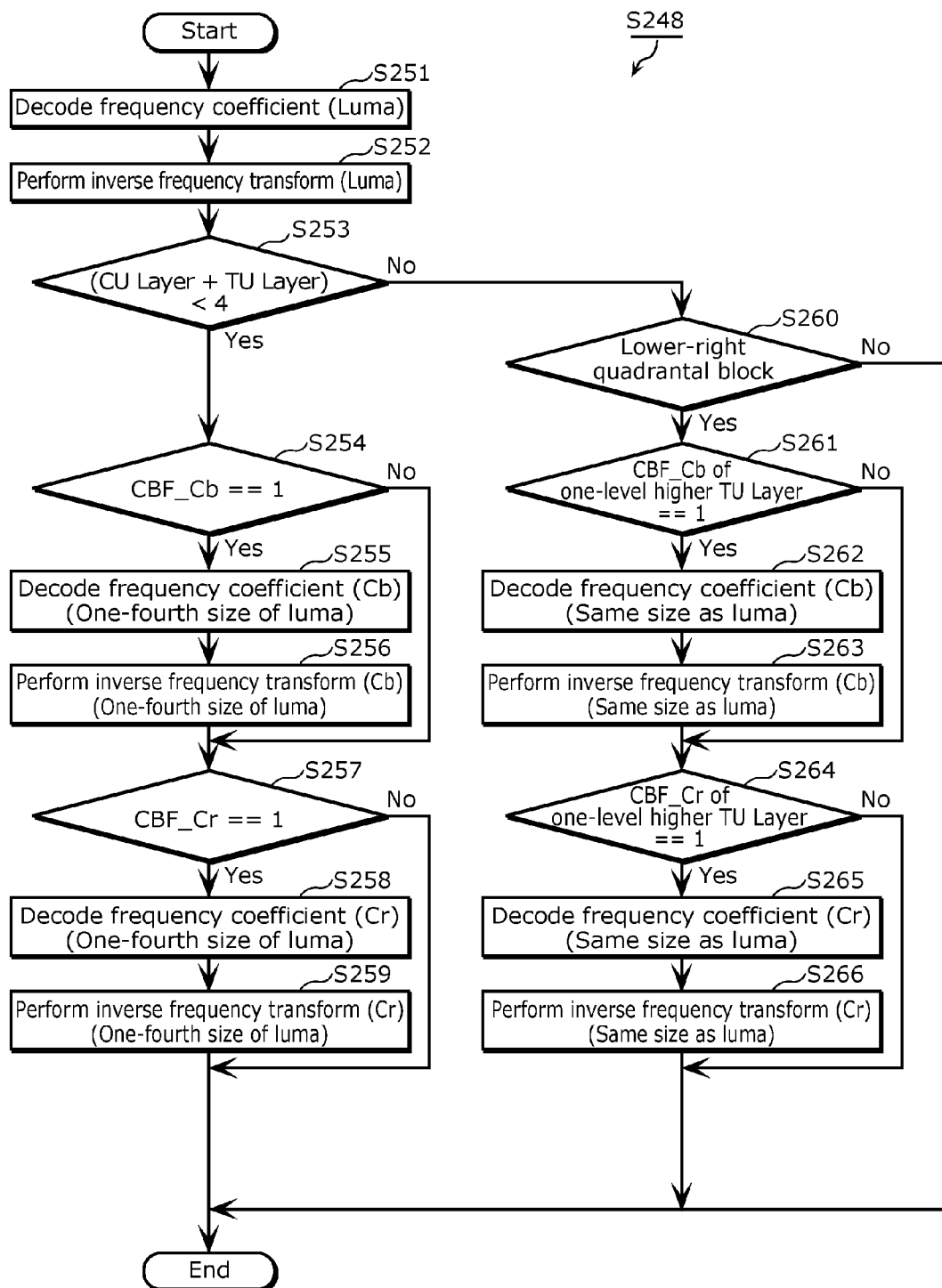
FIG. 19 is a flowchart showing an example of operation of a TU decoding unit shown in FIG. 14.

Operation of the TU decoding unit 240 (details of operation in Step S248 in FIG. 18) will be described below on the basis of FIG. 19. FIG. 19 is a flowchart showing an example of steps in processing of TU decoding (part of the image decoding method).

First, the TU decoding unit 240 performs TU decoding on a luma (brightness) component of an image (S251 to S252).

More specifically, the frequency coefficient decoding unit 241 of the TU decoding unit 240 decodes frequency coefficients of a luma component in a TU (S251). Furthermore, the inverse transform unit 242 of the TU decoding unit 240 performs inverse transform on the decoded frequency coefficients (S252).

Next, the TU decoding unit 240 performs TU decoding on chroma (color difference) components of the image (S253 to S266).

More specifically, when the sum of the value of CU Layer and the value of TU Layer is smaller than four (or when the TU size is larger than 4×4) (S253, Yes), the frequency coefficient decoding unit 241 moves on to Step S254.

When CBF_Cb has a value of 1 in Step S254 (S254, Yes), the frequency coefficient decoding unit 241 decodes frequency coefficients a of Cb component of the TU (S255). The inverse transform unit 242 performs inverse frequency transform on the decoded frequency coefficients (S256).

When CBF_Cr has a value of 1 in Step S254 (S257, Yes), the frequency coefficient decoding unit 241 decodes frequency coefficients of a Cr component of the TU (S258). The inverse transform unit 242 performs inverse frequency transform on the decoded frequency coefficients (S259). Assume that image is in 4:2:0 format, and therefore the number of Cb pixels and the number of Cr pixels are each one-fourth the number of luma pixels.

When it is determined that the sum of the value of CU Layer and the value of TU Layer is four (or when the TU size is 4×4) in Step S253 (S253, No), the TU decoding unit 240 performs decoding and inverse frequency transform (S261 to S266) only when the lower-right block of quadrantal blocks is the current TU (S260, Yes). Quadrantal blocks are bound so that the decoding and inverse frequency transform on each chroma component are performed on pixels as few as pixels of the luma component on which decoding and inverse frequency transform are performed.

Hereinafter, this processing will be concretely described with reference to FIG. 6. In FIG. 6, the twenty-fourth to twenty-seventh TUs in transform order have a size of 4×4. When the twenty-fourth to twenty-sixth TUs in transform order are the current TU to be processed, the TU decoding unit 240 does not perform decoding or inverse frequency transform on Cb or Cr. Instead, the TU decoding unit 240 processes Cb of the twenty-fourth to twenty-seventh TUs in transform order at once when the twenty-seventh TU is the current TU to be processed. The TU decoding unit 240 processes Cr in the same manner. In other words, the TU decoding unit 240 binds Cb pixels of the twenty-fourth to twenty-seventh TUs in transform order to form a block when the twenty-seventh TU is the current TU to be processed, and reconstruct a difference block for the block. The TU decoding unit 240 reconstructs a difference block for Cr pixels in the same manner.

This is because when a Cb component or a Cr component in a TU having a size of 4×4 are processed in the same manner as a luma component, inverse frequency transform is to be performed on each 2×2 pixel block. When inverse frequency transform is to be performed on each 2×2 pixel block, a circuit or a software module for 2×2-pixel frequency transform is necessary in addition to a circuit or a software module for 4×4-pixel frequency transform. Thus, such necessity of frequency transform of each 2×2-pixel block is eliminated by binding quadrantal blocks.

In other words, in Embodiment 2, the inverse frequency transform and decoding on chroma components are performed on the basis of quadrantal blocks bound to be as few as blocks on the basis of which processing of a luma component is performed.

Since inverse frequency transform and so on are performed on blocks of bound quadrantal pixels, the TU decoding unit 240 determines, with reference to CBF_Cb for TU Layer one level higher, whether or not to perform the inverse frequency transform and so on (S261). In an example shown in FIG. 6 and FIG. 7, the TU decoding unit 240 refers to CBF_Cb for TU Layer having a value of 2 in order to make the determination for the twenty-fourth to twenty-seventh TUs in transform order.

The processing will be described below using FIG. 12 as an example. In the case of the twenty-fourth to twenty-seventh TUs in transform order shown in FIG. 6, CBF_Cb for TU Layer having a value of 2 has a value of 1. In this case, the TU decoding unit 240 determines to perform inverse frequency transform and so on (S261, Yes).

When the TU decoding unit 240 determines to perform inverse frequency transform and so on in Step S261, the frequency coefficient decoding unit 241 performs decoding of frequency coefficients on Cb (S262), and the inverse transform unit 242 performs inverse frequency transform on the frequency coefficients (S263).

Similarly, the TU decoding unit 240 determines, with reference to CBF_Cr for TU Layer one level higher, whether or not to perform inverse frequency transform and so on (S264). When the TU decoding unit 240 determines to perform inverse frequency transform and so on in Step S264, the frequency coefficient decoding unit 241 performs decoding of frequency coefficients (S265), and the inverse transform unit 242 performs inverse frequency transform on the frequency coefficients (S266).

Note that in Embodiment 2, since the TU decoding unit 240 makes the determination with reference to CBF_Cb or CBF_Cr for TU Layer one level higher when the TU size is 4×4, the TU decoding unit 240 never refers to CBF_Cb or CBF_Cr for TU Layer at a lower level where the TU size is 4×4. Thus, in quadtree transform shown in FIG. 18, CBF_Cb and CBF_Cr are not decoded when the sum of the value of CU Layer and the value of TU Layer is four (or when the TU size of TU Layer at the current level is 4×4) (S234, No).

(2-8. Effects)

As described above, in Embodiment 2, CBF_Cb is decoded only when CBF_Cb for TU Layer one level higher has a value of 1, and CBF_Cr is decoded only when CBF_Cr for TU Layer one level higher has a value of 1. This configuration contributes to reduction in the amount of codes and computational complexity. In other words, when CBF_Cb for TU Layer at a level has a value of 0, CBF_Cb for TU Layer at lower levels need not be decoded however small the TU of TU Layer at the lower level is split into. The same applies to CBF_Cr. As a result, the amount of codes and computational complexity are reduced.

Furthermore, in Embodiment 2, when the TU size is 4×4, inverse frequency transform of Cb and Cr is performed on the basis of bound quadrantal blocks. In other words, decoding of CBF_Cb or CBF_Cr is not performed for TU Layer at a level where the TU size is 4×4. This enables reduction in circuit size of an arithmetic unit and the amount of codes. More specifically, inverse frequency transform is performed on the basis of bound quadrantal blocks so that the minimum size for inverse frequency transform can be 4×4 in the case of chroma (Cb and Cr) components as well. The image decoding apparatus 200 thus no longer needs to include a circuit for 2×2-pixel inverse frequency transform, so that the circuit size can be reduced. Furthermore, as described above, CBF_Cb or CBF_Cr for TU Layer at a level where the TU size is 4×4 is not necessary when four quadrantal blocks are bound, so that the amount of codes can be reduced.

Furthermore, CBF_Cb and CBF_Cr are decoded for TU Layer at the highest level, but CBF_Cb or CBF_Cr is not decoded for TU Layer at a level where the TU size is 4×4 as described above. This conflict can be avoided by setting the minimum size of CUs larger than 4×4 so that TUs are always larger than 4×4 for TU Layer at the highest level. In other words, decoding of CBF_Cb or CBF_Cr is performed upon the satisfaction of the following two conditions.

(1) TU Layer is at a level where TUs have a size larger than the minimum size; and (2) CBF_Cb or CBF_Cr for TU Layer at the highest level or for TU Layer one level higher has a value of 1.

In Embodiment 2, the minimum size of CUs is limited to 8×8 so that the condition (1) is satisfied.

In Embodiment 2, the TU size of TU Layer, which is determined from the sum of the value of CU Layer and the value of TU Layer, may be determined using any other method of determining a TU size. For example, the TU size may be determined by using another parameter or by counting the number of recursive executions of quadtree decoding or quadtree transform.

Furthermore, although CBF is not used for a luma component in the foregoing description, whether or not to perform decoding (including inverse frequency transform and so on) may be determined using CBF as in the method for Cb and Cr components.

Furthermore, the above-described processing in which the TU split flag is not decoded and is set to have a value of 0 (no split) when the TU size is the minimum size, is given as a non-limiting example. For example, in contrast to the foregoing description, the TU split flag may be processed in a manner such that when the TU size is larger than a predetermined maximum TU size, the split flag is not decoded and is set to have, for example, a value of 1 indicating that the TU is to be split.

Furthermore, the above-described processing in which Cb or is processed on the basis of bound quadrantal blocks to omit inverse frequency transform for 2×2 blocks when the TU size is 4×4, is given as a non-limiting example. For example, when the minimum TU size is set to 8×8, Cb or Cr may be processed on the basis of four bound quadrantal blocks to eliminate necessity of performing inverse frequency transform for 4×4 blocks when the TU size is 8×8. Conditions for binding blocks for the processing may be adaptively set depending on a minimum TU size. In other words, a condition may be set such that quadrantal blocks are bound when the TU size is larger than 8×8. It is also possible that TUs having a minimum size, which is variable, are bound and processed.

Furthermore, the above-described processing in which the TU decoding unit 240 generates a decoded block by adding a reconstructed difference block and a prediction block separately from quadtree transform, is given as a non-limiting example. Generation of a decoded block and quadtree transform may be performed together. For example, a decoded block may be generated by adding a decoded difference block to a prediction block immediately after inverse frequency transform performed in quadtree transform.

The applicable sizes of an LCU include but are not limited to 64×64, 32×32, 128×128, and a further smaller size or a further larger size.

The maximum CU size is not limited to 64×64, and the minimum CU size is not limited to 8×8. The CU may have any size smaller or larger than these sizes, as long as it is larger than the minimum TU size (for example, 4×4). Optionally, the size of a CU may be varied depending on the size of an LCU.

The maximum TU size is not limited to 64×64, and the minimum TU size is not limited to 4×4. A TU may have any size smaller or larger than these sizes, as long as the minimum CU size is larger than the minimum TU size (for example, 4×4). Optionally, the size of a TU may be varied depending on the size of an LCU.

Generally, each of the functional blocks in the above embodiments can be implemented using an MPU or memory. Furthermore the processing to be performed by each of the functional blocks can be implemented as software (program) recorded on a recording medium such as a ROM. The software may be distributed via download or via recording media such as a CD-ROM on which the software is recorded. It is possible as a matter of course to implement each of the functional blocks as hardware (dedicated circuitry).

Furthermore, the processing described in each of the embodiments may be implemented by integrated processing using a single apparatus (system) or by distributed processing using a plurality of apparatuses. The program may be executed either by a single computer or a plurality of computers. In other words, either integrated processing or distributed processing is applicable.

The present invention is not limited to the above-described embodiments. Various variations of the embodiments are possible and are included in the scope of the present invention.

In the above-described exemplary embodiments, each of the constituent elements may be implemented as a piece of dedicated hardware (processing circuitry) or implemented by executing a software program appropriate for the constituent element. The constituent elements may be implemented by a program execution unit such as a CPU or a processor which reads and executes a software program recorded on a recording medium such as a hard disk or a semiconductor memory.

[Embodiment 3]

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 20:
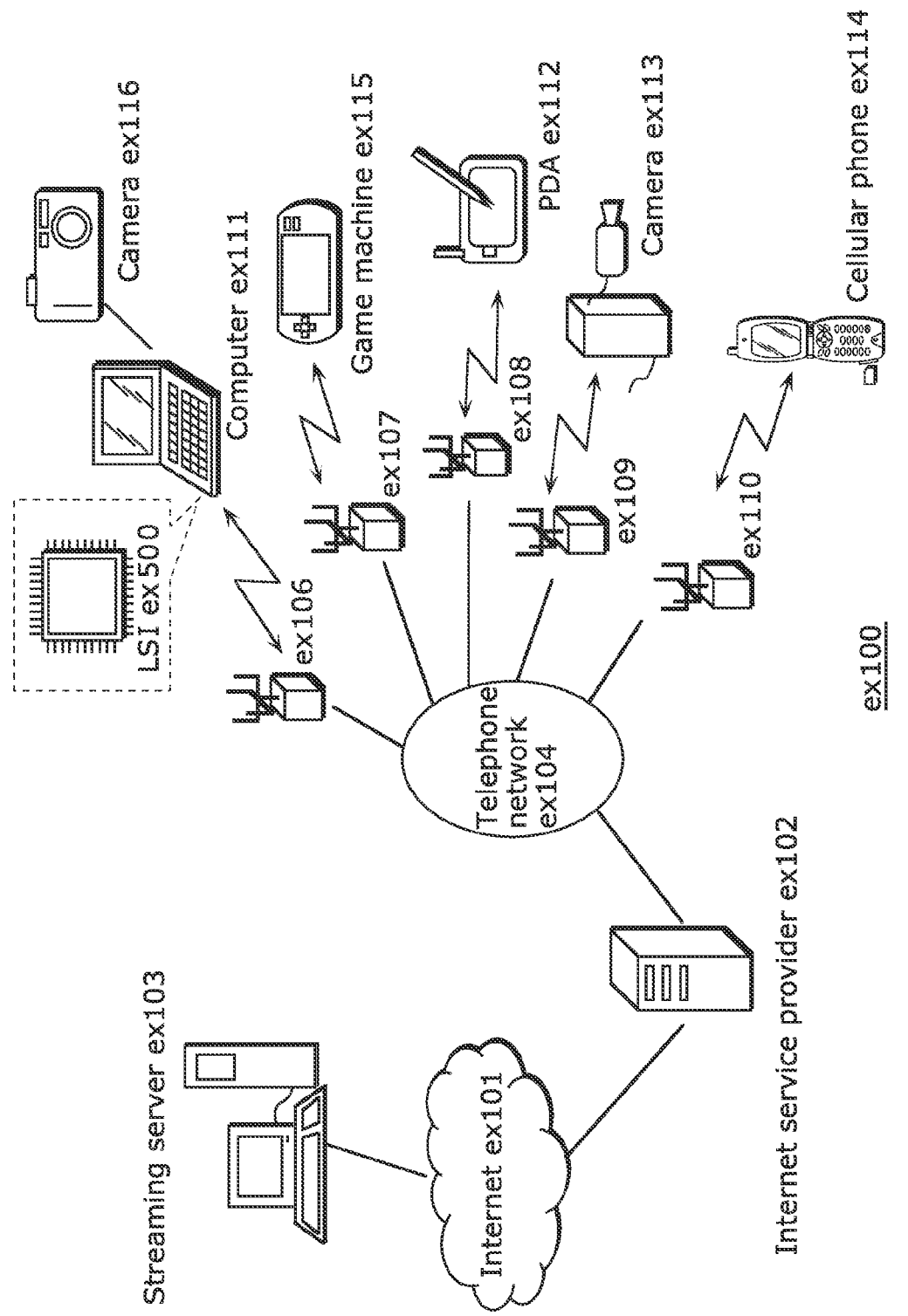
FIG. 20 shows an overall configuration of a content providing system for implementing content distribution services.
Figure 21:
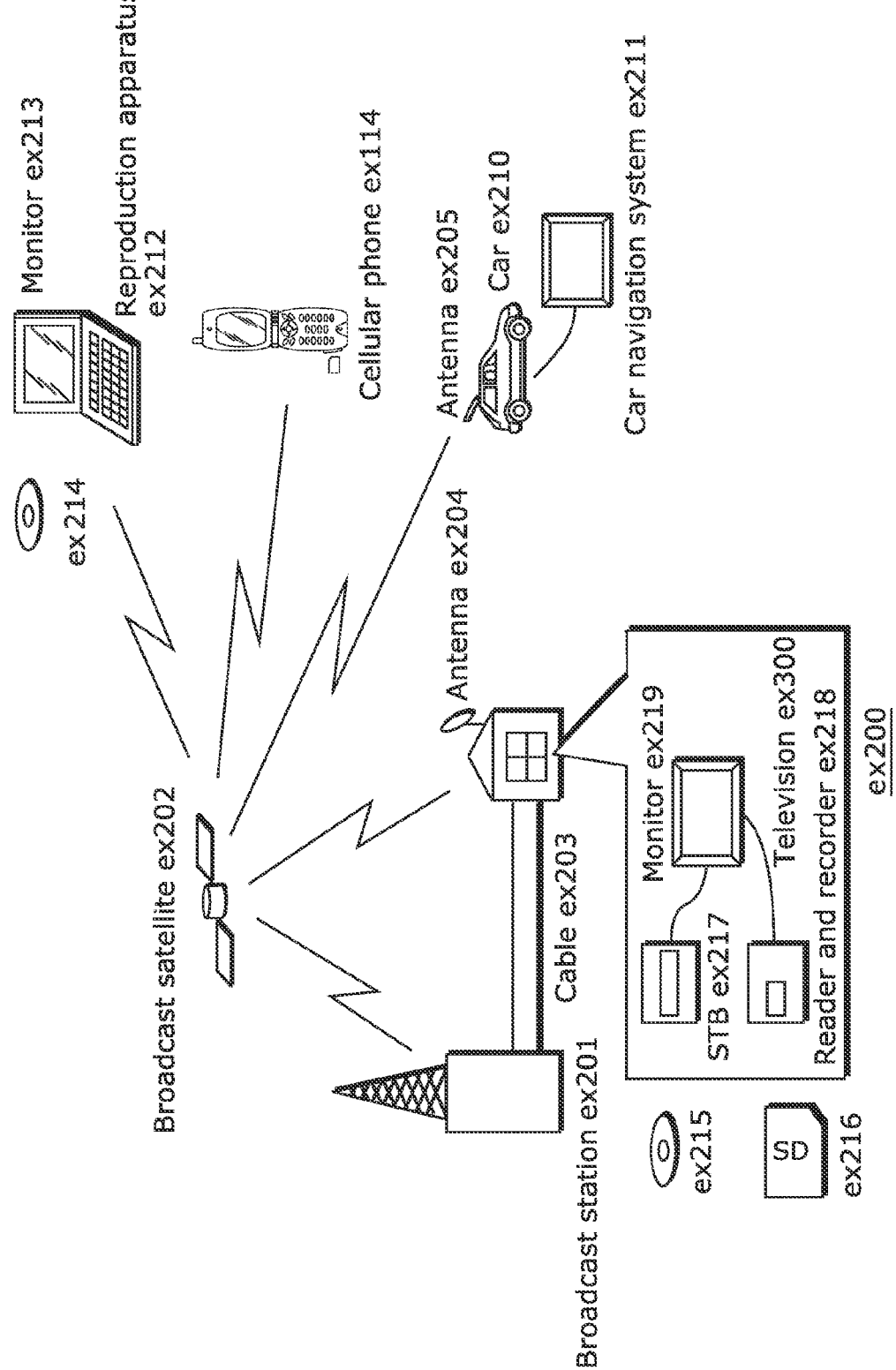
FIG. 21 shows an overall configuration of a digital broadcasting system.

FIG. 20 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 20, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present invention), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present invention).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 111. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present invention).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 22:
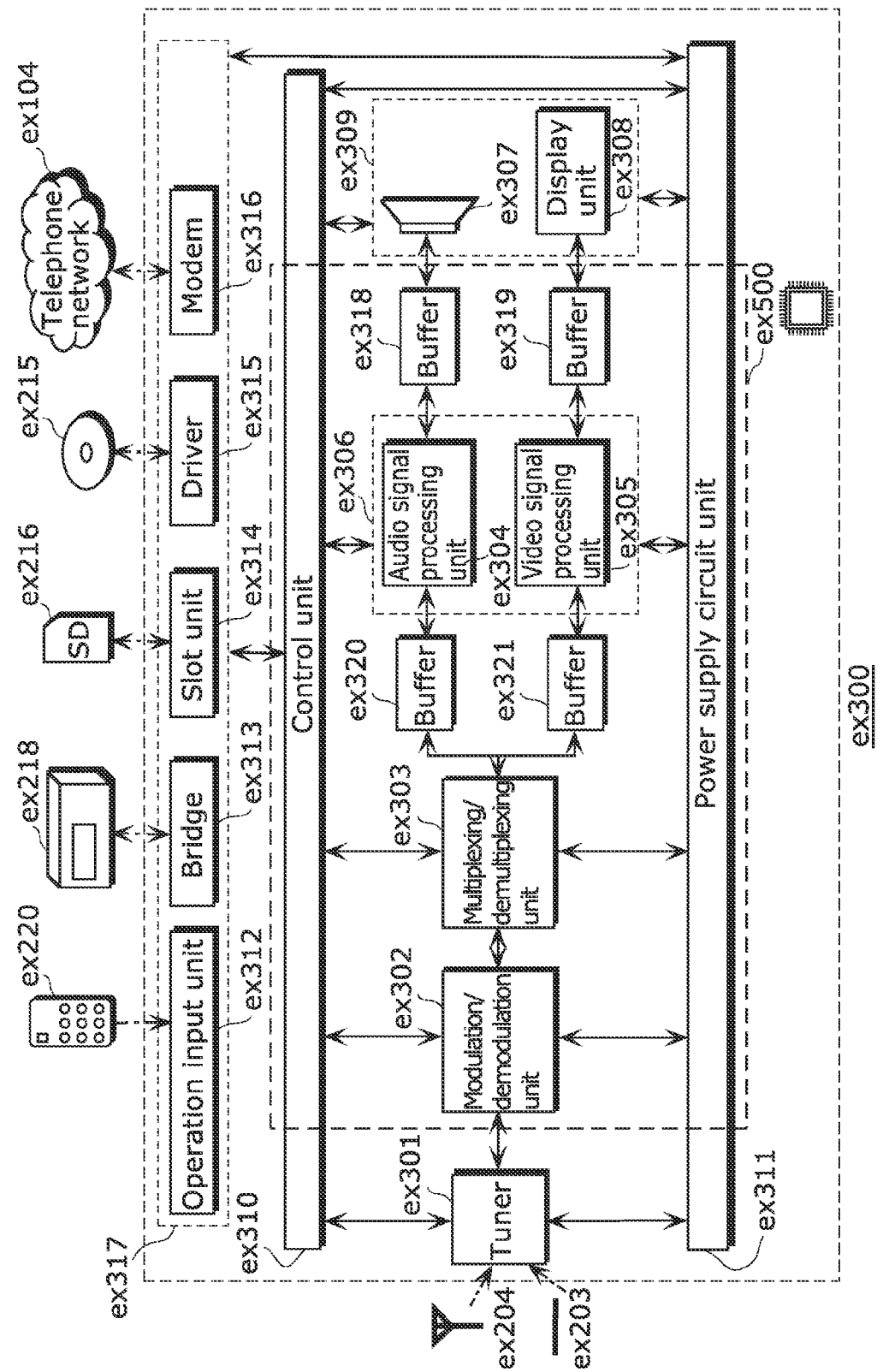
FIG. 22 shows a block diagram illustrating an example of a configuration of a television.

FIG. 22 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present invention); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 23:
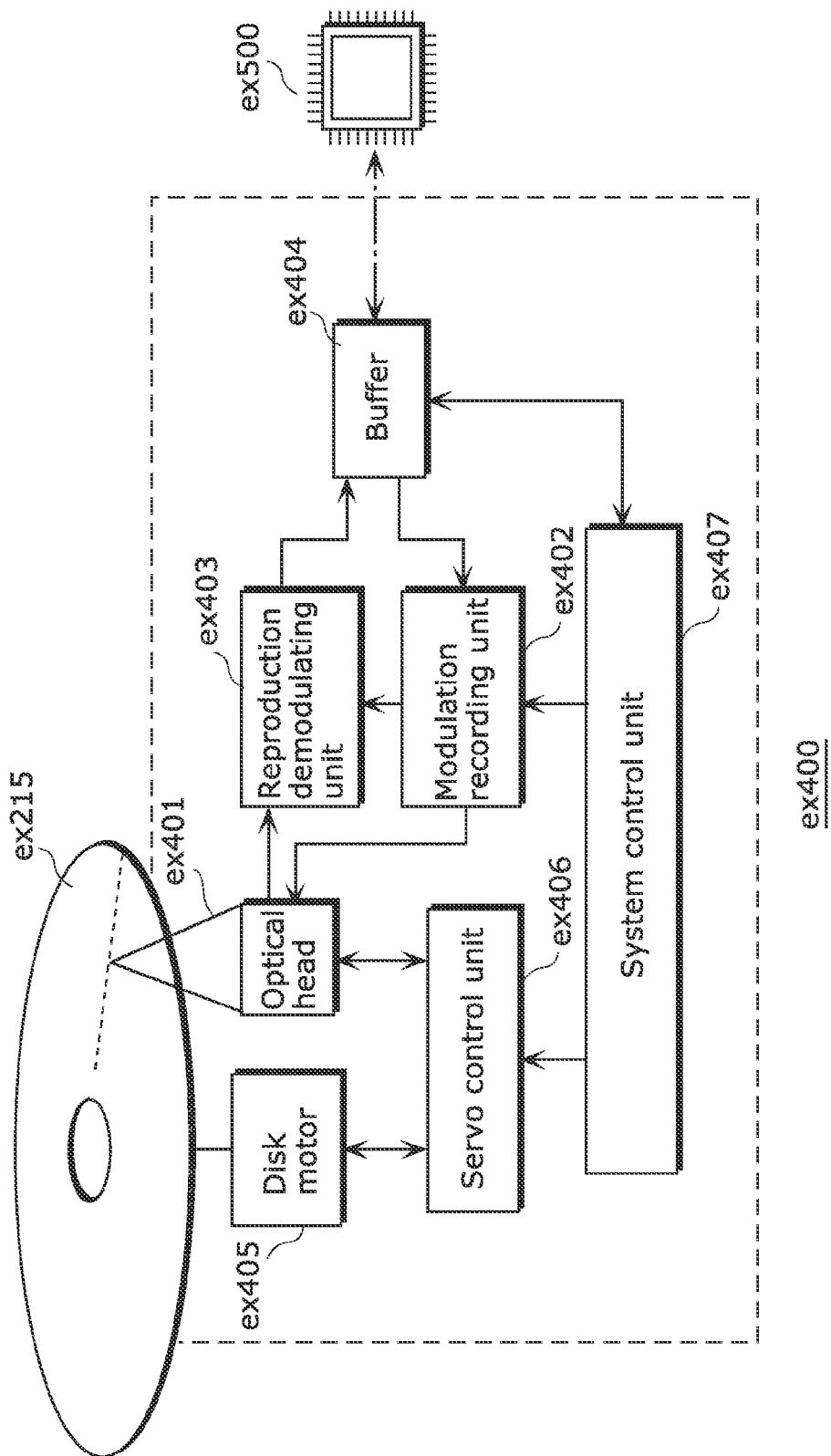
FIG. 23 shows a block diagram illustrating an example of a configuration of an information reproducing/recording unit that reads and writes information from and on a recording medium that is an optical disk.

As an example, FIG. 23 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 24:
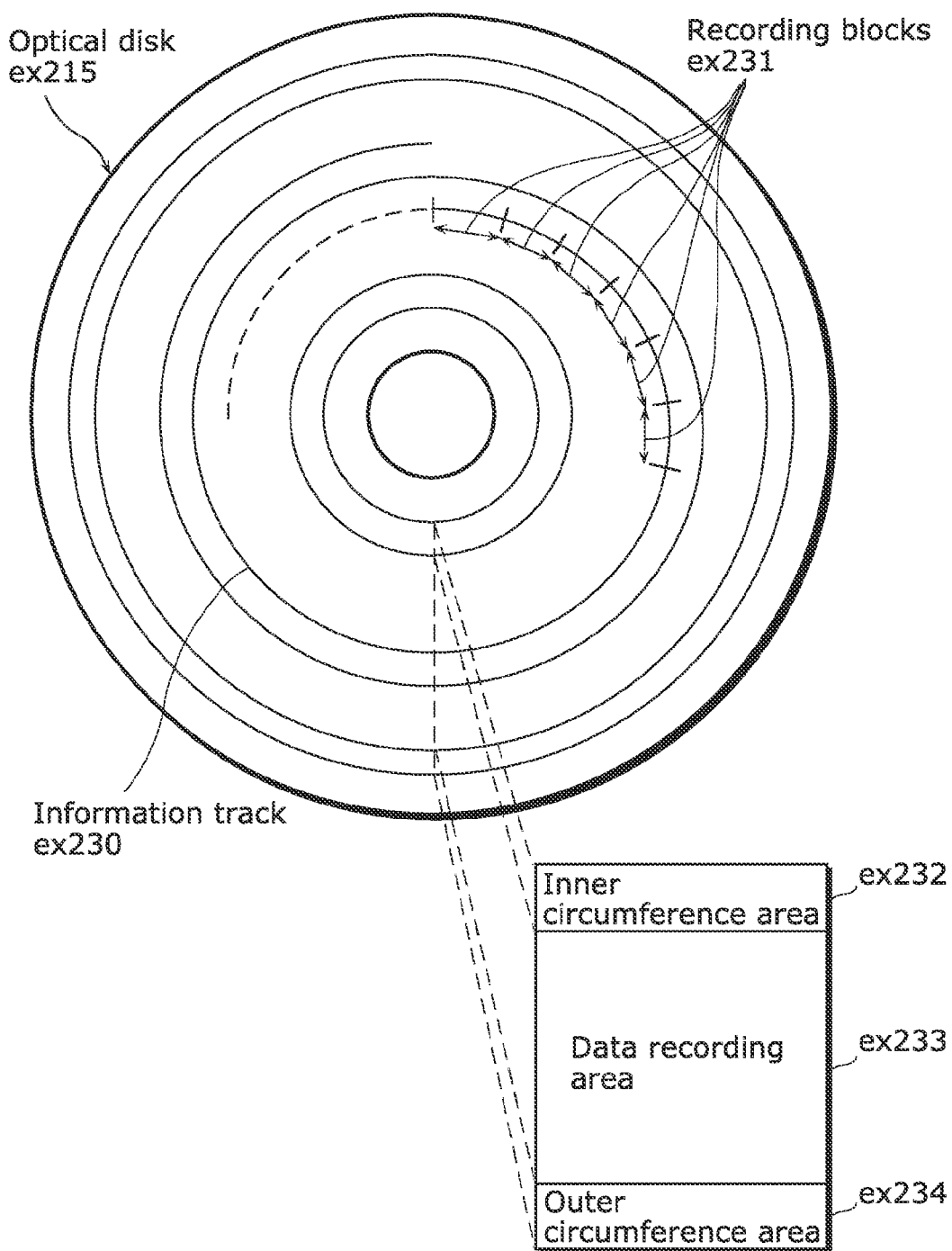
FIG. 24 shows an example of a configuration of a recording medium that is an optical disk.

FIG. 24 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 22. The same will be true for the configuration of the computer ex111, the cellular phone ex114, and others.

Figure 25A:
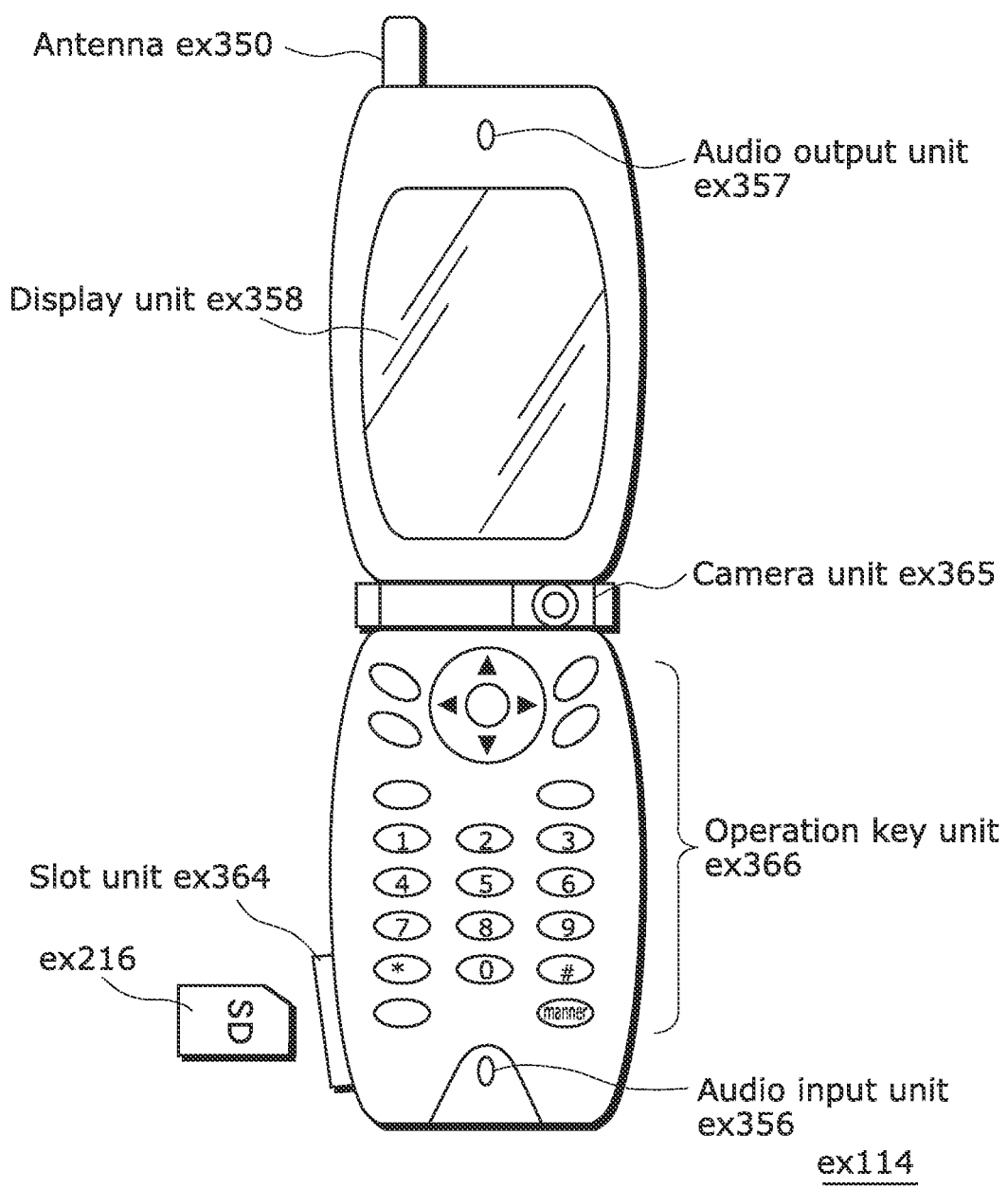
FIG. 25A shows an example of a cellular phone.
Figure 25B:
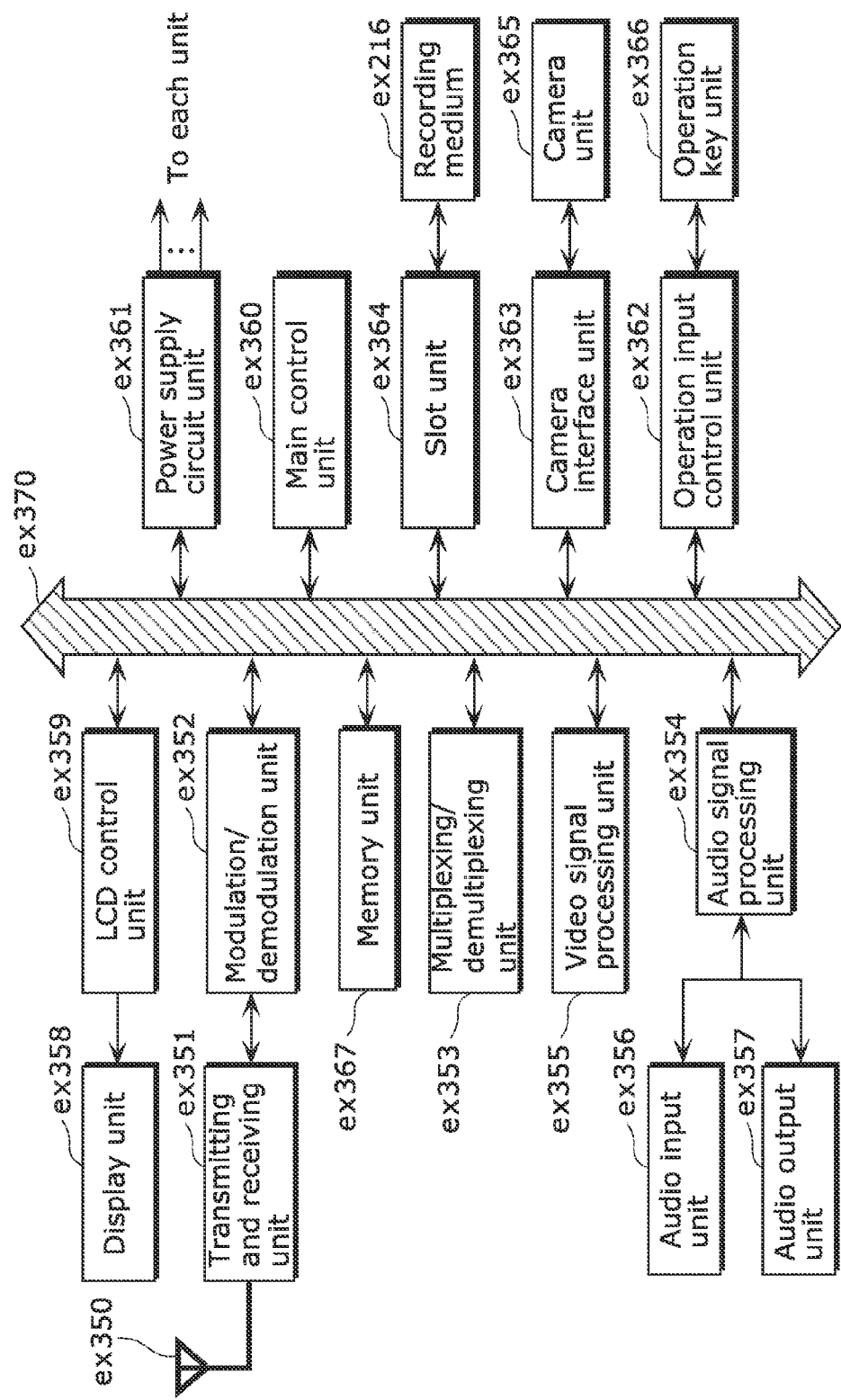
FIG. 25B is a block diagram showing an example of a configuration of a cellular phone.

FIG. 25A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Next, an example of a configuration of the cellular phone ex114 will be described with reference to FIG. 115B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present invention), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present invention), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, it is possible for a terminal such as the cellular phone ex114 to have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

[Embodiment 4]

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since the standard to which each of the plurality of the video data to be decoded conforms cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 26 illustrates a structure of the multiplexed data. As illustrated in FIG. 26, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 27:
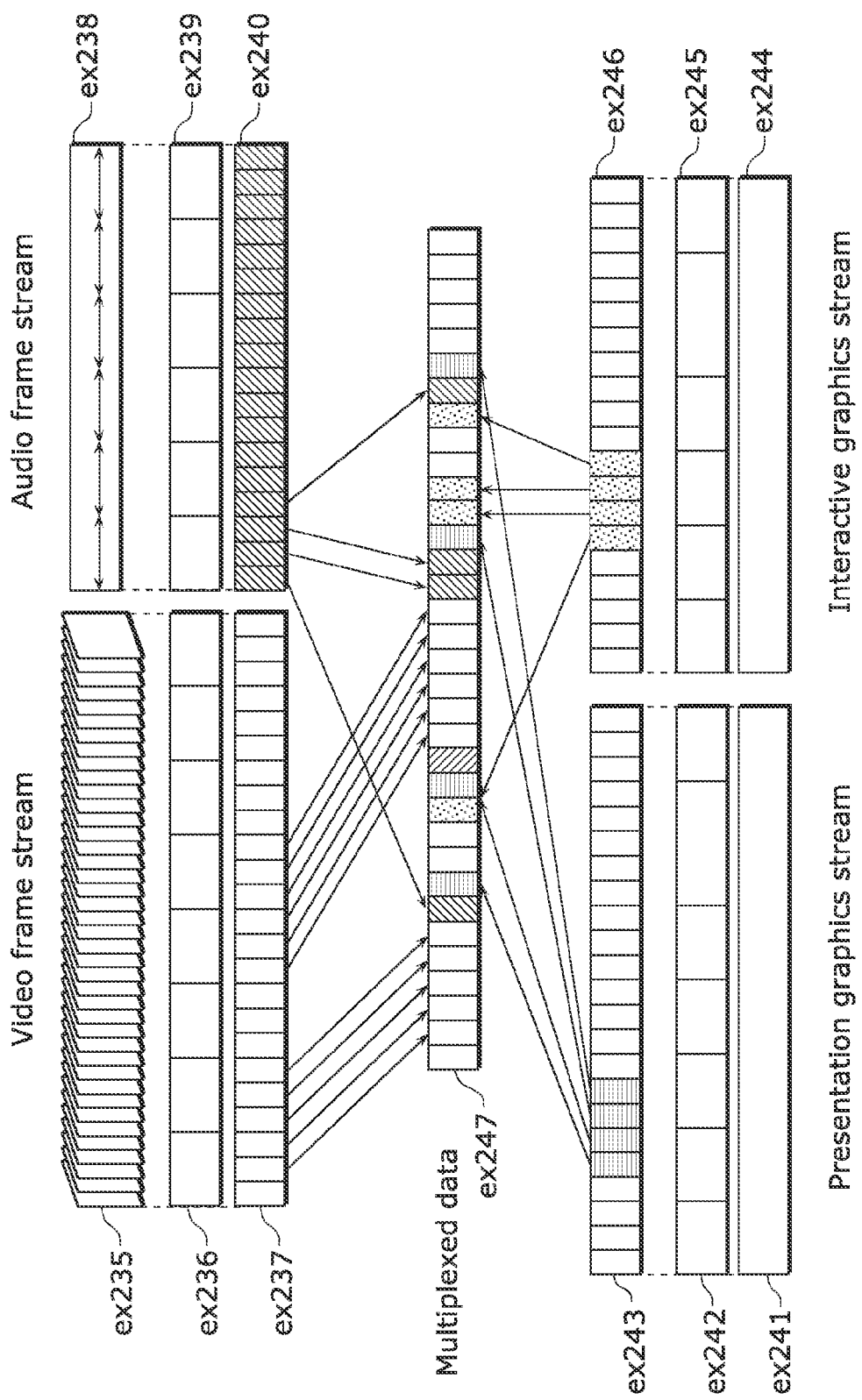
FIG. 27 schematically shows how each stream is multiplexed in multiplexed data.

FIG. 27 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 28:
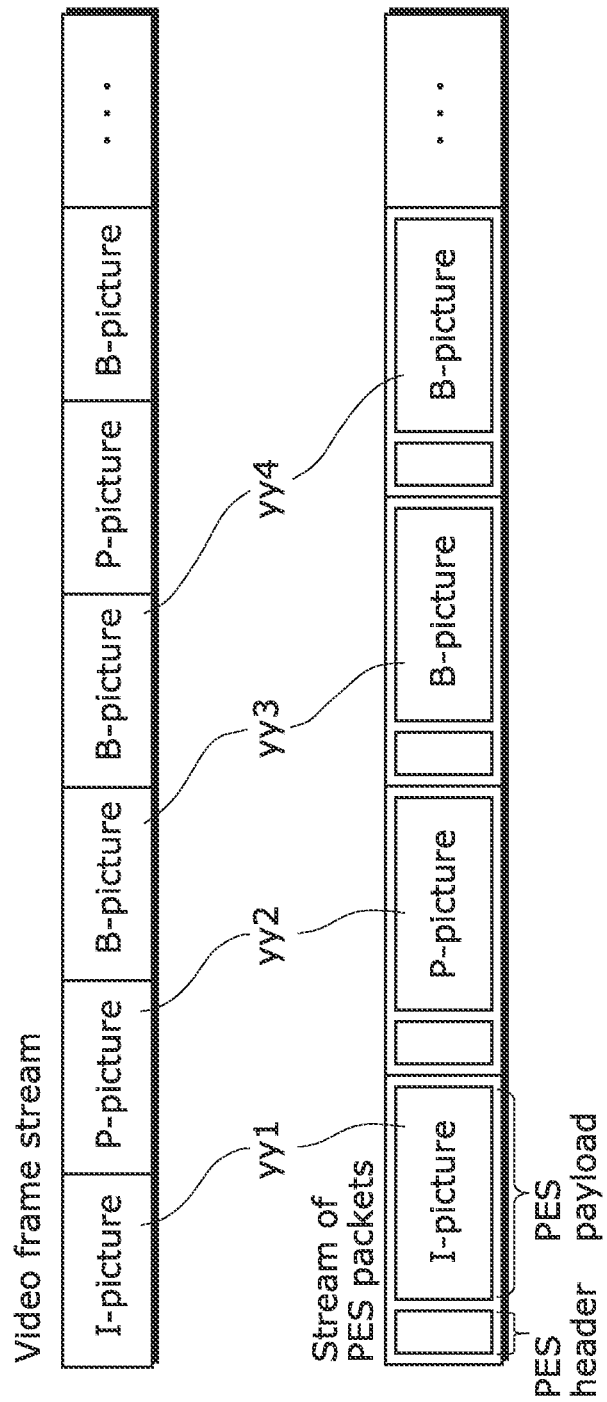
FIG. 28 shows how a video stream is stored in a stream of PES packets in more detail.

FIG. 28 illustrates how a video stream is stored in a stream of PES packets in more detail. The first bar in FIG. 28 shows a video frame stream in a video stream. The second bar shows the stream of PES packets. As indicated by arrows denoted as yy1, yy2, yy3, and yy4 in FIG. 28, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 29 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 29. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 30:
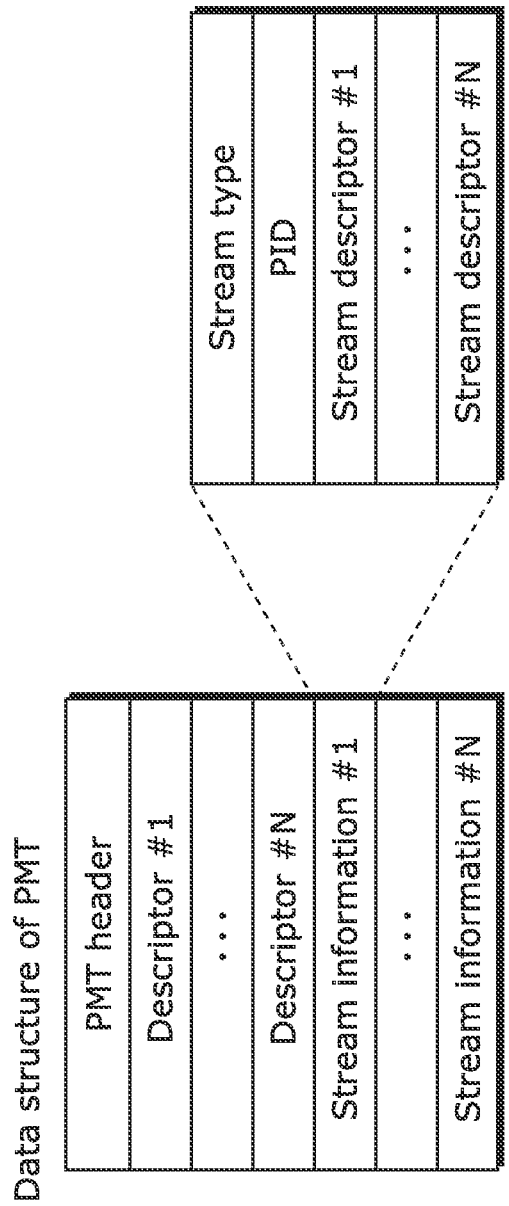
FIG. 30 shows a data structure of a PMT.

FIG. 30 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 31:
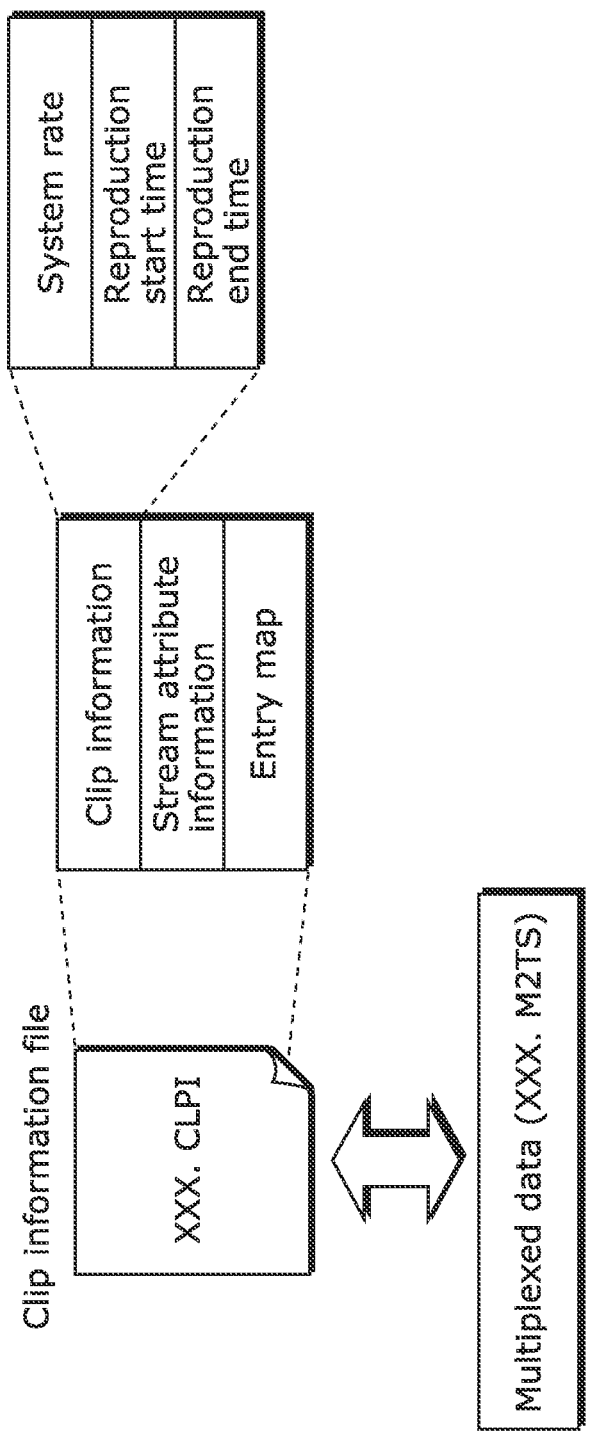
FIG. 31 shows an internal structure of multiplexed data information.

Each of the multiplexed data information files is management information of the multiplexed data as shown in FIG. 31. The multiplexed data information files are in one to one correspondence with the multiplexed data, and each of the files includes multiplexed data information, stream attribute information, and an entry map.

As illustrated in FIG. 31, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 32:
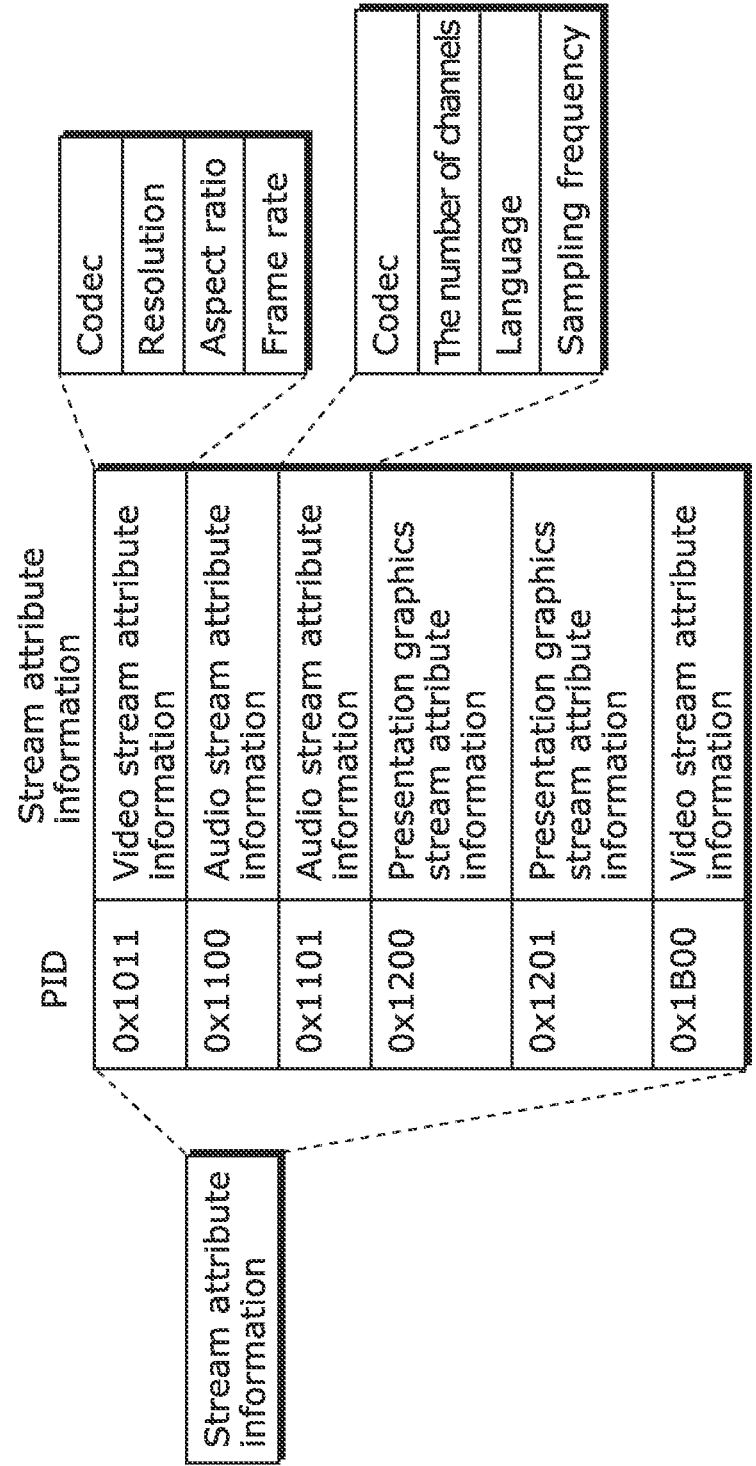
FIG. 32 shows an internal structure of stream attribute information.

As shown in FIG. 32, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 33:
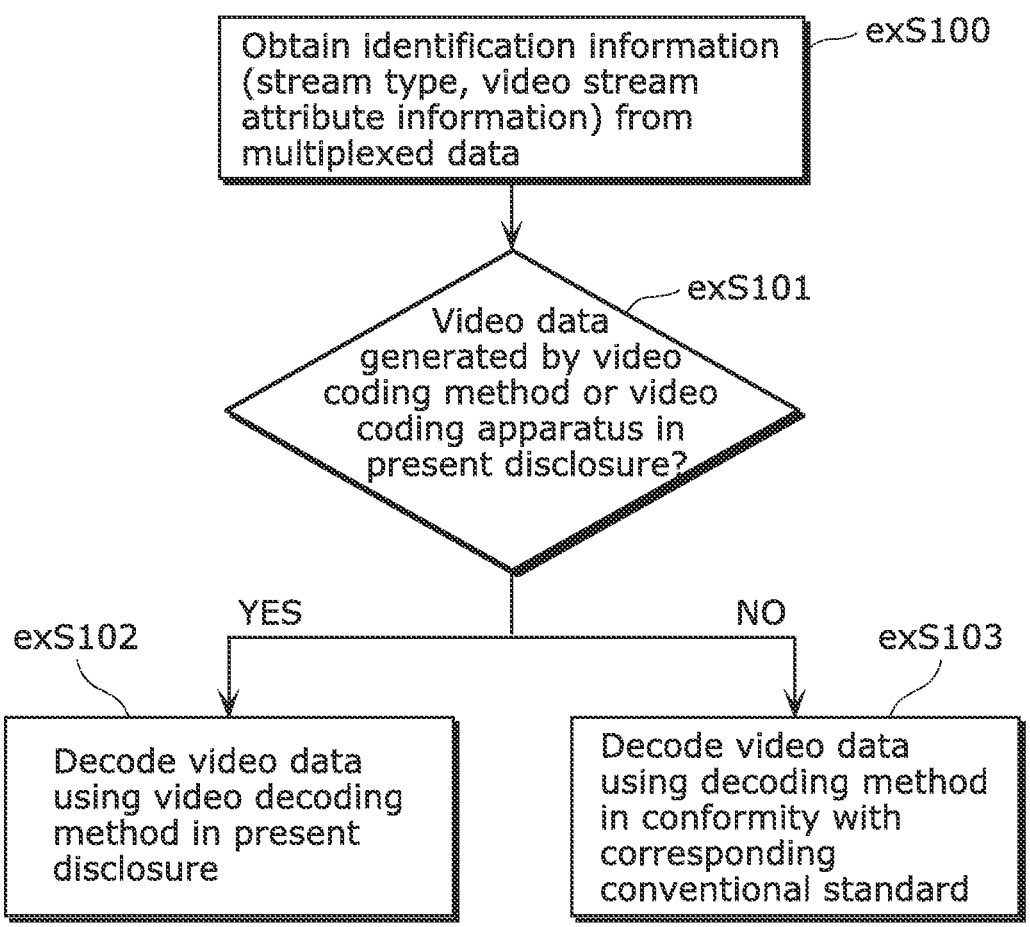
FIG. 33 shows steps for identifying video data.

Furthermore, FIG. 33 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

[Embodiment 5]

Figure 34:
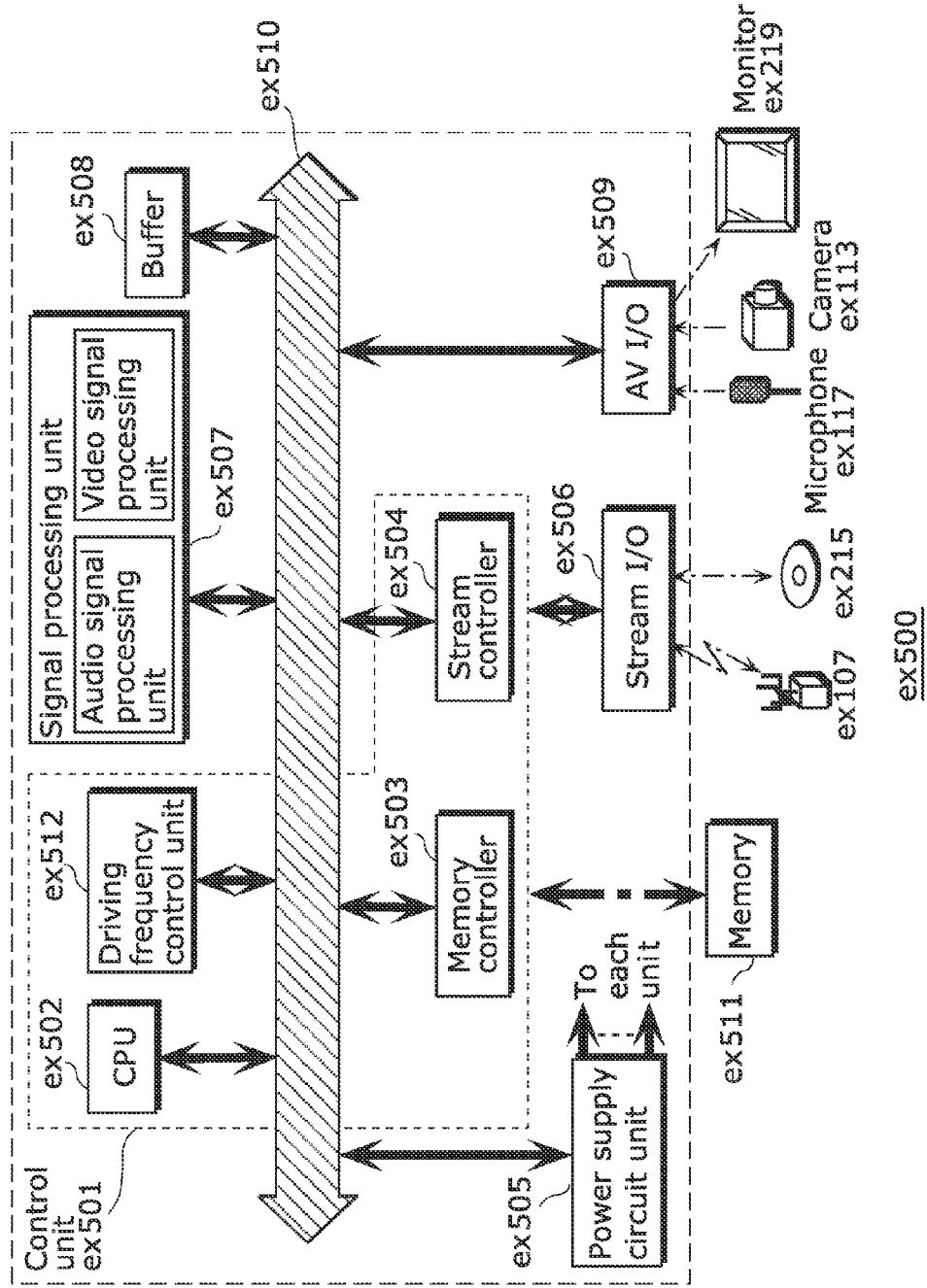
FIG. 34 shows an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 34 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose. Such a programmable logic device can typically execute the moving picture coding method and/or the moving picture decoding method according to any of the above embodiments, by loading or reading from a memory or the like one or more programs that are included in software or firmware.

In the future, with advancement in semiconductor technology, a brand-new technology may replace LSI. The functional blocks can be integrated using such a technology. The possibility is that the present invention is applied to biotechnology.

[Embodiment 6]

When video data generated in the moving picture coding method or by the moving picture coding apparatus described in each of embodiments is decoded, it is possible for the processing amount to increase compared to when video data that conforms to a conventional standard, such as MPEG-2, MPEG-4 AVC, and VC-1 is decoded. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 35:
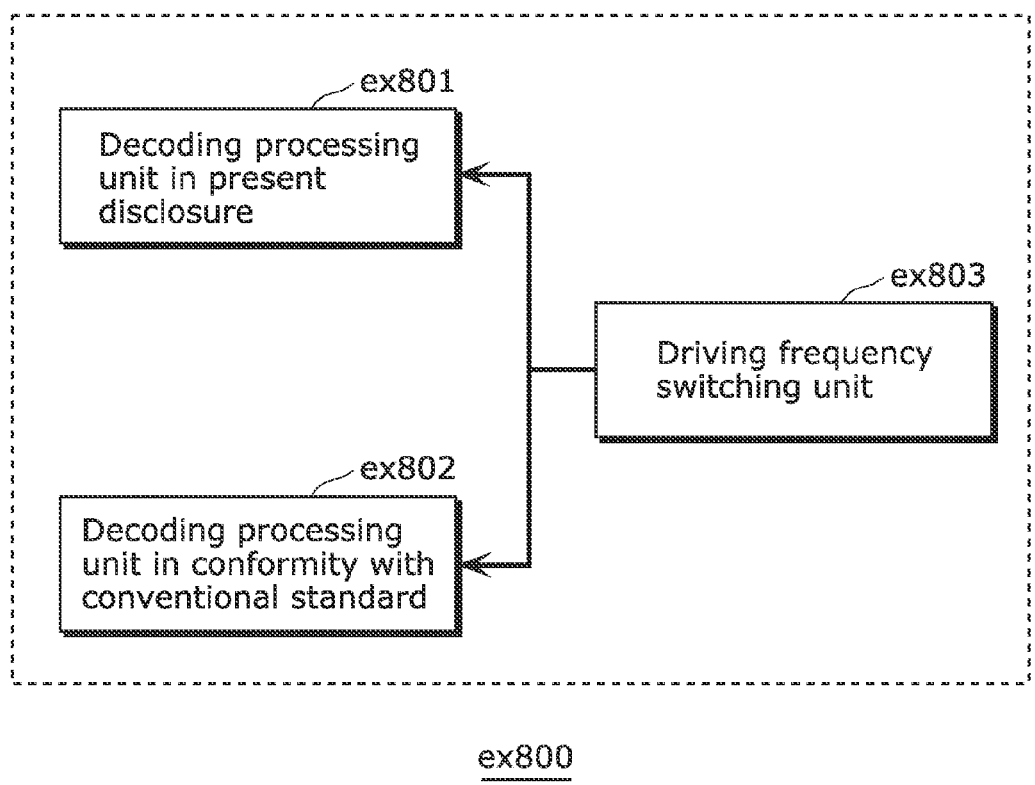
FIG. 35 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 35 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 34. Here, each of the decoding processing unit ex801 that executes the moving picture decoding method described in each of embodiments and the decoding processing unit ex802 that conforms to the conventional standard corresponds to the signal processing unit ex507 in FIG. 34. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, it is possible that the identification information described in Embodiment 4 is used for identifying the video data. The identification information is not limited to the one described in Embodiment 4 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 37. The driving frequency can be selected by storing the look-up table in the buffer ex508 and in an internal memory of an LSI, and with reference to the look-up table by the CPU ex502.

Figure 36:
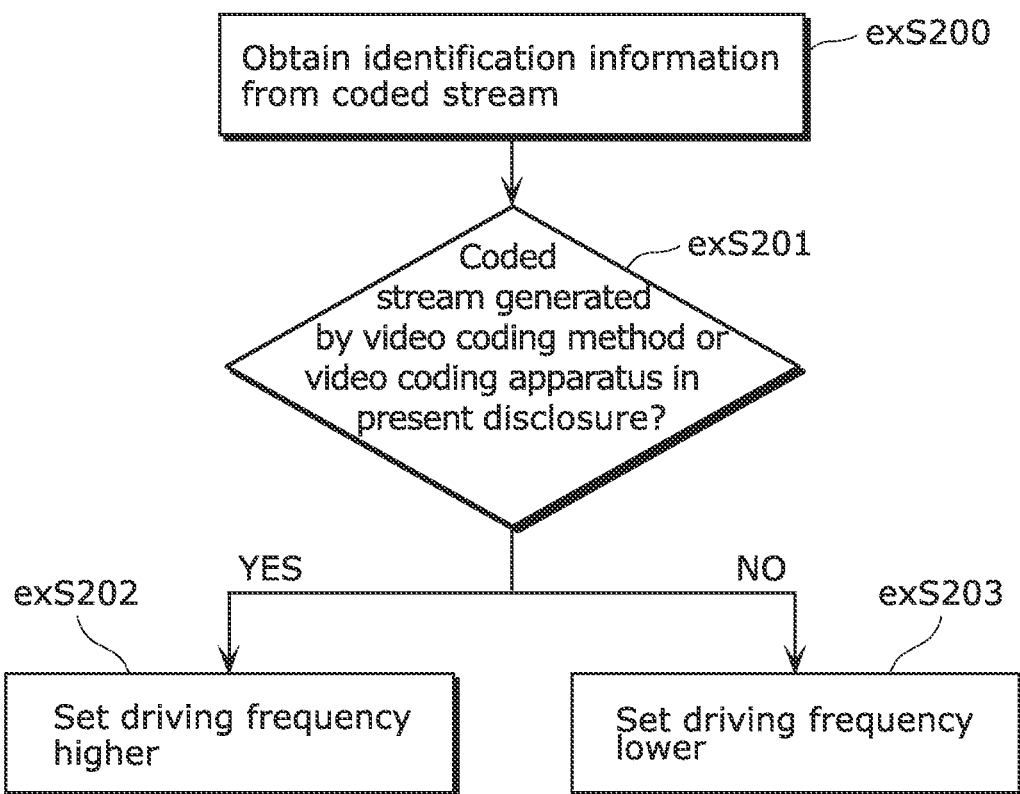
FIG. 36 shows steps for identifying video data and switching between driving frequencies.

FIG. 36 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, it is possible that the voltage to be applied to the LSI ex500 or the apparatus including the LSI ex500 is set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, it is possible that the driving frequency is set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, it is possible that the voltage to be applied to the LSI ex500 or the apparatus including the LSI ex500 is set higher. When the identification information indicates that the video data conforms to the conventional standard, such as MPEG-2, MPEG-4 AVC, and VC-1, it is possible that the voltage to be applied to the LSI ex500 or the apparatus including the LSI ex500 is set lower. As another example, it is possible that, when the identification information indicates that the video data is generated by the moving picture coding method and the moving picture coding apparatus described in each of embodiments, the driving of the CPU ex502 is not suspended, and when the identification information indicates that the video data conforms to the conventional standard, such as MPEG-2, MPEG-4 AVC, and VC-1, the driving of the CPU ex502 is suspended at a given time because the CPU ex502 has extra processing capacity. It is possible that, even when the identification information indicates that the video data is generated by the moving picture coding method and the moving picture coding apparatus described in each of embodiments, in the case where the CPU ex502 has extra processing capacity, the driving of the CPU ex502 is suspended at a given time. In such a case, it is possible that the suspending time is set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

[Embodiment 7]

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 38A:
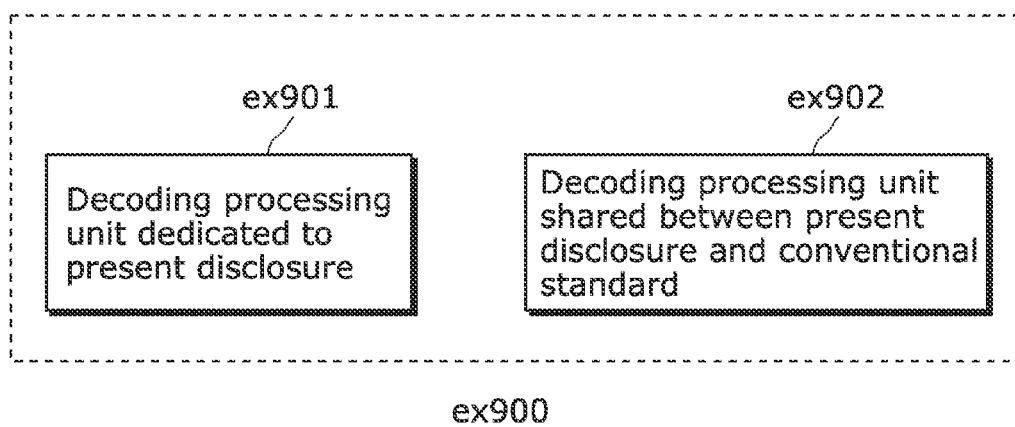
FIG. 38A is a diagram showing an example of a configuration for sharing a module of a signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 38A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. It is possible for a decoding processing unit ex902 that conforms to MPEG-4 AVC to be shared by common processing operations, and for a dedicated decoding processing unit ex901 to be used for processing which is unique to an aspect of the present invention and does not conform to MPEG-4 AVC. In particular, since the aspect of the present invention is characterized by inverse quantization, it is possible, for example, for the dedicated decoding processing unit ex901 to be used for inverse quantization, and for the decoding processing unit to be shared by any or all of the other processing, such as entropy decoding, deblocking filtering, and motion compensation. The decoding processing unit for implementing the moving picture decoding method described in each of embodiments may be shared for the processing to be shared, and a dedicated decoding processing unit may be used for processing unique to that of MPEG-4 AVC.

Figure 38B:
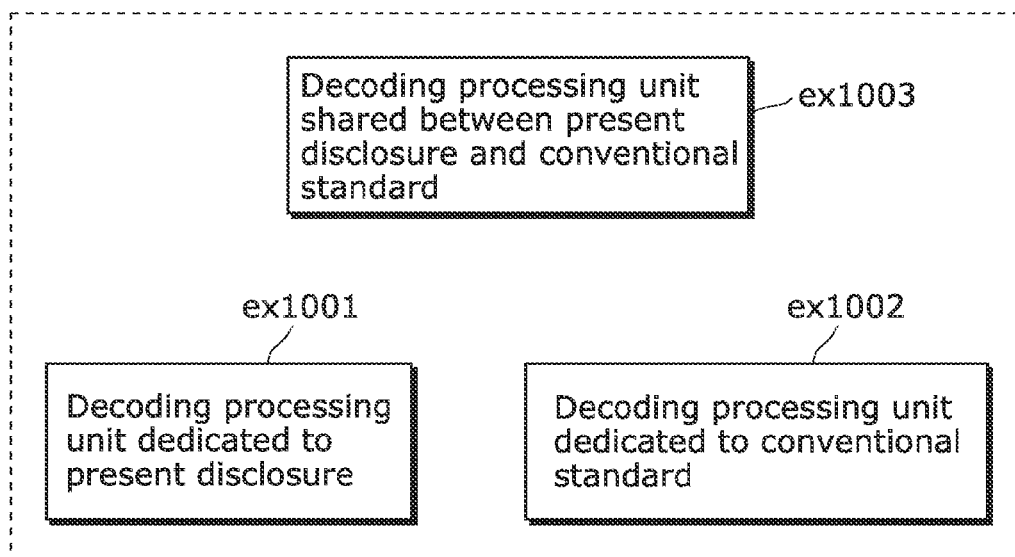
FIG. 38B is a diagram showing another example of a configuration for sharing a module of the signal processing unit.

Furthermore, ex1000 in FIG. 38B shows another example in that processing is partly shared. This example uses a configuration including a dedicated decoding processing unit ex1001 that supports the processing unique to an aspect of the present invention, a dedicated decoding processing unit ex1002 that supports the processing unique to another conventional standard, and a decoding processing unit ex1003 that supports processing to be shared between the moving picture decoding method according to the aspect of the present invention and the conventional moving picture decoding method. Here, the dedicated decoding processing units ex1001 and ex1002 are not necessarily specialized for the processing according to the aspect of the present invention and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present invention and the moving picture decoding method in conformity with the conventional standard.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The image coding method and the image decoding method according to the present disclosure are applicable to any type of multimedia data. The image coding method and the image decoding method according to the present disclosure are useful methods for use in storage, transmission, and communication of data using, for example, mobile phones, DVD systems, or personal computers.

The invention claimed is:

1. An image coding and decoding apparatus which transforms a chroma component and a luma component of an input image, and which decodes the input image from a coded bitstream, the image coding and decoding apparatus comprising:
   processing circuitry; and
   storage accessible from the processing circuitry,
   the input image including one or more transform blocks each having a luma component and a chroma component,
   the luma component being to be processed on a basis of a luma block which belongs to a current one of the one or more transform blocks and has a same size as a size of the current transform block,
   the chroma component being to be processed on a basis of a chroma block which is in a current one of the one or more transform blocks and has a size smaller than the size of the luma block, and
   the processing circuitry respectively performing a coding method and a decoding method,
   wherein the coding method includes:
   deriving coefficients of the luma component by performing transform on the luma component and deriving coefficients of the chroma component by performing transform on the chroma component; and
   coding the coefficients of the luma component and the coefficients of the chroma component,
   wherein when the size of the current transform block is 4×4, the processing circuitry is configured to derive the coefficients of the chroma component by performing the transform on the chroma component on a basis of a block resulting from binding a plurality of the chroma blocks, the resulting block having a same size as the size of the luma block, and
   wherein the decoding method includes:
   decoding coefficients of the luma component and coefficients of the chroma component which are coded and included in the coded bitstream; and
   deriving the luma component by performing transform on the coefficients of the luma component and deriving the chroma component by performing transform on the coefficients of the chroma component,
   wherein when the size of the current transform block is 4×4, the processing circuitry is configured to derive the chroma component by performing the transform on the coefficients of the chroma component on a basis of a block resulting from binding a plurality of the chroma blocks, the resulting block having a same size as the size of the luma block.

* * * * *